US011990679B2

United States Patent
Bisiules et al.

(10) Patent No.: US 11,990,679 B2
(45) Date of Patent: May 21, 2024

(54) BASE STATION ANTENNAS HAVING AN ACTIVE ANTENNA MODULE(S) AND RELATED DEVICES AND METHODS

(71) Applicant: CommScope Technologies LLC, Hickory, NC (US)

(72) Inventors: Peter J. Bisiules, LaGrange Park, IL (US); Haifeng Li, Richardson, TX (US); Samantha Merta, Richardson, TX (US)

(73) Assignee: CommScope Technologies LLC, Claremont, NC (US)

( * ) Notice: Subject to any disclaimer, the term of this patent is extended or adjusted under 35 U.S.C. 154(b) by 16 days.

(21) Appl. No.: 17/836,168

(22) Filed: Jun. 9, 2022

(65) Prior Publication Data

US 2022/0407240 A1 Dec. 22, 2022

Related U.S. Application Data

(60) Provisional application No. 63/236,727, filed on Aug. 25, 2021, provisional application No. 63/211,273, filed on Jun. 16, 2021.

(51) Int. Cl.
*H01Q 21/00* (2006.01)
*H01Q 1/24* (2006.01)
*H01Q 19/10* (2006.01)
*H01Q 21/30* (2006.01)

(52) U.S. Cl.
CPC ......... *H01Q 21/0025* (2013.01); *H01Q 1/246* (2013.01); *H01Q 19/10* (2013.01); *H01Q 21/30* (2013.01)

(58) Field of Classification Search
CPC .......... H01Q 1/246; H01Q 1/40; H01Q 1/405; H01Q 19/10; H01Q 21/0006; H01Q 21/30
See application file for complete search history.

(56) References Cited

U.S. PATENT DOCUMENTS

| | | | | |
|---|---|---|---|---|
| 10,601,120 | B2 | 3/2020 | Bisiules et al. | |
| 11,552,408 | B2 * | 1/2023 | Tang | H01Q 21/08 |
| 2010/0013729 | A1 * | 1/2010 | Harel | H01Q 21/08 343/837 |
| 2010/0214190 | A1 * | 8/2010 | Shin | H01Q 21/26 343/834 |
| 2014/0313095 | A1 | 10/2014 | Pu et al. | |
| 2017/0222313 | A1 * | 8/2017 | Markof | H01Q 21/26 |
| 2018/0337443 | A1 * | 11/2018 | Bisiules | H01Q 1/246 |
| 2019/0312339 | A1 | 10/2019 | Fritze et al. | |

(Continued)

FOREIGN PATENT DOCUMENTS

| | | | |
|---|---|---|---|
| WO | 2019236203 | A2 | 12/2019 |
| WO | 2020072880 | A1 | 4/2020 |
| WO | 2020086303 | A1 | 4/2020 |

OTHER PUBLICATIONS

International Search Report and the Written Opinion of the International Searching Authority corresponding to International Patent Application No. PCT/US2022/032760 (12 pages) (dated Oct. 13, 2022).

*Primary Examiner* — Jason M Crawford
(74) *Attorney, Agent, or Firm* — Myers Bigel, P.A.

(57) ABSTRACT

Base station antennas include an externally accessible active antenna module releasably coupled to a rear of the housing. The base station antenna housing has a passive antenna assembly that cooperates with the active antenna module.

24 Claims, 26 Drawing Sheets

(56) References Cited

U.S. PATENT DOCUMENTS

| | | | | |
|---|---|---|---|---|
| 2020/0259248 | A1 | 8/2020 | Lv et al. | |
| 2021/0057796 | A1* | 2/2021 | Xu | H01Q 1/246 |
| 2021/0129276 | A1* | 5/2021 | Zhu | B23P 21/004 |
| 2021/0218156 | A1* | 7/2021 | Patel | H01Q 21/0037 |
| 2021/0242599 | A1* | 8/2021 | Deng | H01Q 17/001 |
| 2021/0305717 | A1* | 9/2021 | Hou | H01Q 19/10 |
| 2021/0384641 | A1* | 12/2021 | Tang | H01Q 21/08 |
| 2022/0094051 | A1* | 3/2022 | Ameer P | H01Q 21/26 |
| 2022/0393339 | A1* | 12/2022 | Soni | H01Q 1/42 |
| 2022/0407240 | A1* | 12/2022 | Bisiules | H01Q 21/30 |

* cited by examiner

BASE STATION ANTENNAS HAVING AN ACTIVE ANTENNA MODULE(S) AND RELATED DEVICES AND METHODS

RELATED APPLICATIONS

This patent application claims the benefit of and priority to U.S. Provisional Patent Application Ser. No. 63/211,273, filed Jun. 16, 2021, and U.S. Provisional Patent Application Ser. No. 63/236,727, filed Aug. 25, 2021, the contents of which are hereby incorporated by reference as if recited in full herein.

BACKGROUND

The present invention generally relates to radio communications and, more particularly, to base station antennas for cellular communications systems.

Cellular communications systems are well known in the art. In a cellular communications system, a geographic area is divided into a series of regions that are referred to as "cells" which are served by respective base stations. The base station may include one or more antennas that are configured to provide two-way radio frequency ("RF") communications with mobile subscribers that are within the cell served by the base station. In many cases, each cell is divided into "sectors." In one common configuration, a hexagonally shaped cell is divided into three 120° sectors in the azimuth plane, and each sector is served by one or more base station antennas that have an azimuth Half Power Beamwidth (HPBW) of approximately 65°. Typically, the base station antennas are mounted on a tower or other raised structure, with the radiation patterns (also referred to herein as "antenna beams") that are generated by the base station antennas directed outwardly. Base station antennas are often implemented as linear or planar phased arrays of radiating elements.

In order to accommodate the increasing volume of cellular communications, cellular operators have added cellular service in a variety of new frequency bands. In order to increase capacity without further increasing the number of base station antennas, multi-band base station antennas have been introduced which include multiple linear arrays of radiating elements. Additionally, base station antennas are now being deployed that include "beamforming" arrays of radiating elements that include multiple columns of radiating elements. The radios for these beamforming arrays may be integrated into the antenna so that the antenna may perform active beamforming (i.e., the shapes of the antenna beams generated by the antenna may be adaptively changed to improve the performance of the antenna). These beamforming arrays typically operate in higher frequency bands, such as some, or all, of the 3.3-4.2 GHz frequency band. Antennas having integrated radios that can adjust the amplitude and/or phase of the sub-components of an RF signal that are transmitted through individual radiating elements or small groups thereof are referred to as "active antennas." Active antennas can steer the generated antenna beams in different directions by changing the amplitudes and/or phases of the sub-components of RF signals that are transmitted through the antenna.

FIGS. 1 and 2 illustrate an example of a prior art "active" base station antenna 10 that includes a pair of beamforming arrays and associated beamforming radios. The base station antenna 10 is typically mounted with the longitudinal axis L of the antenna 10 extending along a vertical axis (e.g., the longitudinal axis L may be generally perpendicular to a plane defined by the horizon) when the antenna 10 is mounted for normal operation. The front surface of the antenna 10 is mounted opposite the tower or other mounting structure, pointing toward the coverage area for the antenna 10. The antenna 10 includes a radome 11 and a top end cap 20. The antenna 10 also includes a bottom end cap 30 which includes a plurality of connectors 40 mounted therein. As shown, the radome 11, top cap 20 and bottom cap 30 define an external housing **10*h* for the antenna 10. An antenna assembly is contained within the housing 10*h***.

FIG. 2 illustrates that the antenna 10 can include one or more radios 50 that are mounted to the housing **10*h*. As the radios 50 may generate significant amounts of heat, it may be appropriate to vent heat from the active antenna in order to prevent the radios 50 from overheating. Accordingly, each radio 50 can include a (die cast) heat sink 54 that is mounted on the rear surface of the radio 50. The heat sinks 54 are thermally conductive and include a plurality of fins 54*f*. Heat generated in the radios 50 passes to the heat sink 54 and spreads to the fins 54*f*. As shown in FIG. 2, the fins 54*f* are external to the antenna housing 10*h*. This allows the heat to pass from the fins 54*f*** to the external environment. Further details of example conventional antennas can be found in co-pending WO2019/236203 and WO2020/072880, the contents of which are hereby incorporated by reference as if recited in full herein.

SUMMARY

Pursuant to embodiments of the present invention, base station antennas are provided with passive antenna assemblies with a housing and that are configured to releasably couple to an active antenna module that is at least partially external to the housing of the base station antenna/passive antenna assembly.

Embodiments of the present invention are directed to a base station antenna that has a passive antenna assembly with a housing and a reflector. The reflector has a longitudinally extending right side segment and a laterally spaced apart and longitudinally extending left side segment. The base station antenna also includes an active antenna module coupleable to or coupled to the housing of the passive antenna assembly and first and second spaced apart and longitudinally extending coupling brackets that electrically (and mechanically) couple the base station antenna to the active antenna module. The first coupling bracket extends along a left side of the active antenna module, the second coupling bracket extends along a right side of the active antenna module.

Embodiments of the present invention are directed to a base station antenna that has a passive antenna assembly with a housing and a reflector in the housing. The reflector has a longitudinally extending right side segment and a laterally spaced apart and longitudinally extending left side segment. The base station antenna also has an active antenna module coupleable to or coupled to the housing of the passive antenna assembly and first and second spaced apart and longitudinally extending coupling brackets, the first coupling bracket extending along a left side of the active antenna module, the second coupling bracket extending along a right side of the active antenna module.

The first and second coupling brackets can electrically couple an outer wall of the active antenna module to the reflector.

The reflector can have a laterally and longitudinally extending open space between the right and left side segments aligned with the active antenna module.

The first and second coupling brackets can be configured as or include RF chokes.

The first and second coupling brackets can be configured as dual band RF chokes.

The first and second coupling brackets can each include an L-shaped body, and a first segment of the L-shaped body can be parallel to and adjacent the outer wall of the active antenna module.

The first segment of the L-shaped body can be parallel to and adjacent the outer wall of the active antenna module and can be a long side segment.

The first and second coupling brackets can be configured as a unitary body connected by a laterally extending bracket segment.

The first segment of the L-shaped body can merge into a second segment that is orthogonal to the first segment and that can be parallel to a rail coupling surface of a rail provided by the housing.

The second segment can be parallel to a rail coupling surface and can be a short side of the L-shaped body.

The second segment of the coupling bracket can be internal to the housing and the first segment can project rearward and outwardly from the housing.

The coupling brackets can be configured as RF chokes, optionally dual band RF chokes.

The coupling brackets can comprise L-shaped segments.

The coupling brackets can comprise U-shaped segments.

The reflector can have an aperture that extends laterally between the right and left side segments. The active antenna module can have a radome that extends through and resides in front of the aperture.

The base station antenna can further include at least one array of low band radiating elements. The at least one array of low band radiating elements can extend forward in the housing in front of the reflector.

The active antenna module can have a radio unit (e.g., radio circuitry), a massive MIMO antenna array and a radome. The radome of the active antenna module can face an external front radome provided by the passive antenna assembly.

The passive antenna assembly can have an internal radome that can extend in front of the radome of the active antenna module and across a rear of the housing.

The first and second coupling brackets can be capacitively coupled to the reflector and the active antenna module.

When the coupling brackets are configured as RF chokes, and when viewed from a front of the base station antenna, a right side of the first RF choke can be capacitively coupled to the active antenna module, a left side of the first RF choke can be capacitively coupled to the left side segment of the reflector, a left side of the second RF choke can be capacitively coupled to the active antenna module, and a right side of the second RF choke can be capacitively coupled to the left side segment of the reflector.

The first and second coupling brackets can be capacitively coupled to one or both of the active antenna module or the reflector through at least one radome.

The first and second coupling brackets can be capacitively coupled to the active antenna module and the reflector through a first radome of the active antenna module and a second radome of the passive antenna assembly, the first radome can be coupled to the active antenna module and the second radome residing between the first radome and an external front radome of the passive antenna assembly.

The reflector can be galvanically coupled to the active antenna module.

The reflector can be galvanically coupled to a back of the active antenna module.

The reflector can be capacitively coupled to the active antenna module.

The reflector can be capacitively coupled to at least one conductive member of the active antenna module, optionally coupled through at least one radome.

The at least one conductive member can have a side wall and a support frame that is coupled to the side wall. The support frame can be electrically coupled to a ground plane behind a massive MIMO antenna array inside the active antenna module.

Other embodiments are directed to a base station antenna that has a passive antenna assembly with a housing and a reflector. The reflector can have a longitudinally extending right side segment and a laterally spaced apart and longitudinally extending left side segment. The base station antenna can also include an active antenna module coupleable to or coupled to the housing of the passive antenna assembly and residing between the right side and left side segments of the reflector. The reflector is capacitively or galvanically coupled to a conductive member(s) of the active antenna module to thereby have the reflector at a common ground plane with a component or components of the active antenna module.

The reflector can have an aperture extending laterally and longitudinally between the right and left side segments. The active antenna module can have a radome that extends through and resides in front of the aperture.

The base station antenna can also have at least one array of low band radiating elements. The at least one array of low band radiating elements can extend forward in the housing in front of the reflector.

The active antenna module can have a radio unit, a massive MIMO antenna array and a radome. The radome of the active antenna module can face an external front radome provided by the passive antenna assembly.

The passive antenna assembly can have an internal radome that can extend in front of and across a rear of the housing.

The passive antenna assembly can be galvanically coupled to the active antenna module.

The reflector can be galvanically coupled to a back of the active antenna module.

The at least one conductive member can include a conductive support frame and the support frame can be electrically coupled to a ground plane of a multi-layer printed circuit board behind a massive MIMO antenna array inside the active antenna module.

The reflector can be capacitively coupled to the at least one conductive member of the active antenna module through a radome of the active antenna module.

The reflector can be capacitively coupled to the conductive member of the active antenna module through a first radome provided by the active antenna module and through a second radome provided by the passive antenna assembly.

Still other embodiments are directed to a base station antenna having a passive antenna assembly with a reflector and an active antenna module detachably coupleable to the passive antenna assembly. When assembled, the active antenna module is capacitively or galvanically coupled to the reflector of the passive antenna assembly.

The active antenna module can have a conductive support frame. The conductive support frame can be electrically coupled to a ground plane behind a massive MIMO antenna array inside the active antenna module. The reflector can be capacitively or galvanically coupled to the conductive support frame to electrically be at a common ground as the ground plane.

Yet other embodiments are directed to a base station antenna having a base station antenna housing including a passive antenna assembly with a reflector and an active antenna module detachably coupleable to the base station antenna housing. The active antenna module and/or the base station antenna housing can have a mounting interface configured to have a lock member that has a first recessed position and a second extended position. In the second extended position, the lock member locks the base station antenna housing and the active antenna module together.

DETAILED DESCRIPTION

In the description that follows, a base station antenna 100 will be described using terms that assume that the base station antenna 100 is mounted for use on a tower, pole or other mounting structure with the longitudinal axis L of the antenna 100 (FIGS. 8C, 17, 20) extending along a vertical axis and the front of the base station antenna 100 mounted opposite the tower, pole or other mounting structure pointing toward the target coverage area for the base station antenna 100 and the rear of the base station antenna 100 facing the tower or other mounting structure. It will be appreciated that the base station antenna 100 may not always be mounted so that the longitudinal axis L thereof extends along a vertical axis. For example, the base station antenna 100 may be tilted slightly (e.g., less than 10°) with respect to the vertical axis so that the resultant antenna beams formed by the base station antenna 100 each have a small mechanical downtilt.

Figure 1:
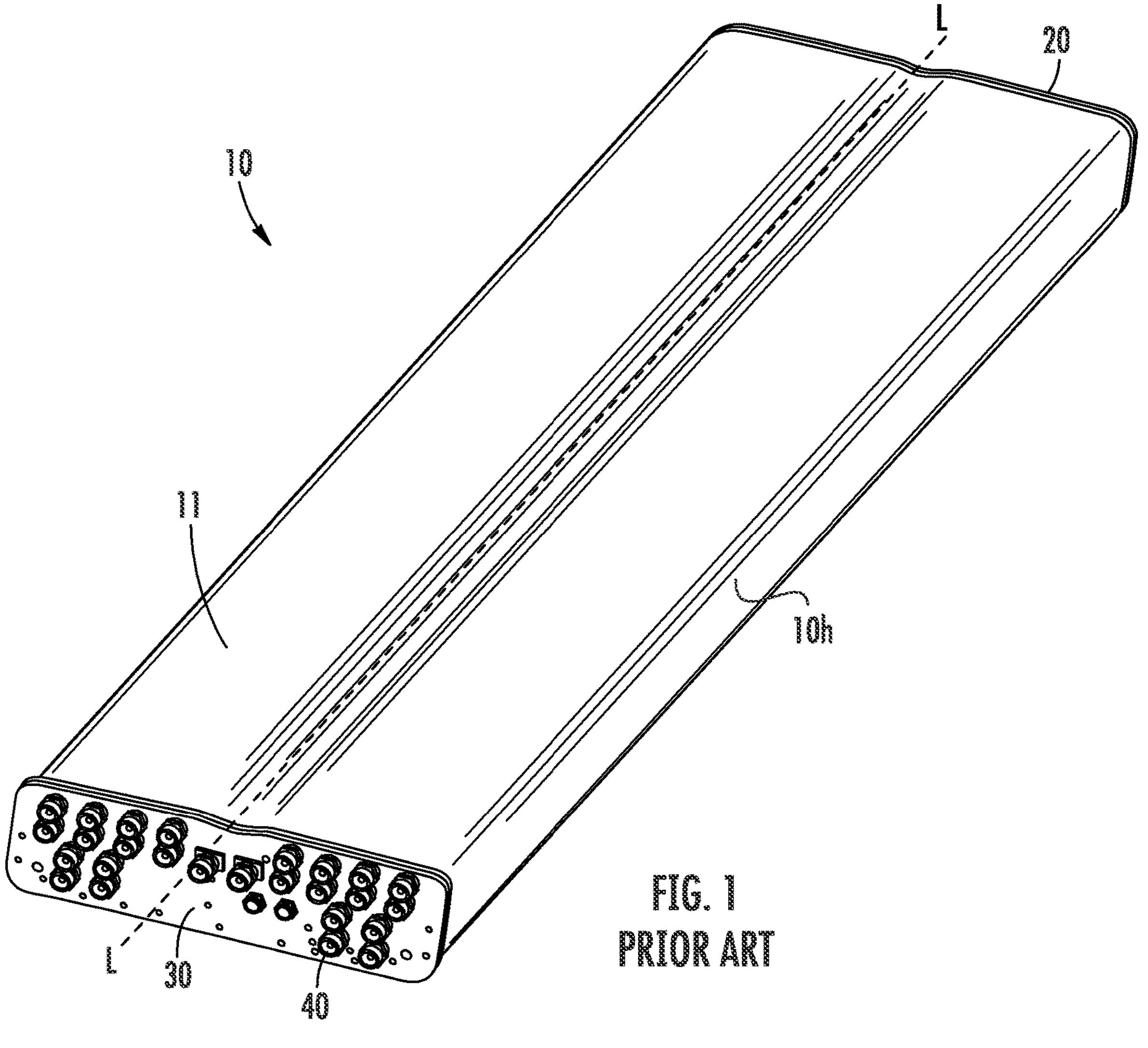
FIG. 1 PRIOR ART
FIG. 1 is a perspective view of a prior art base station antenna.
Figure 2:
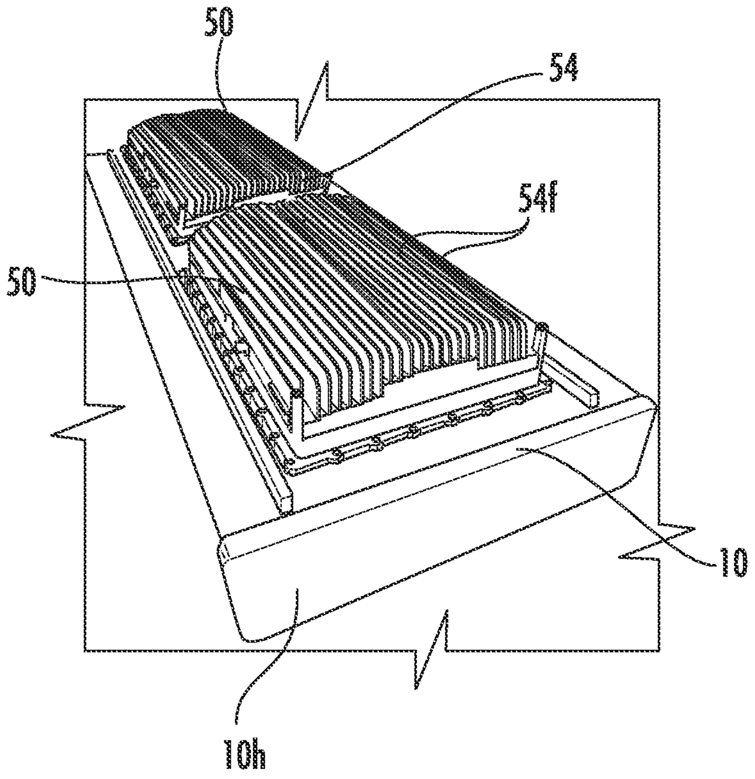
FIG. 2 PRIOR ART
FIG. 2 is a back view of the prior art base station antenna of FIG. 1.
Figure 3A:
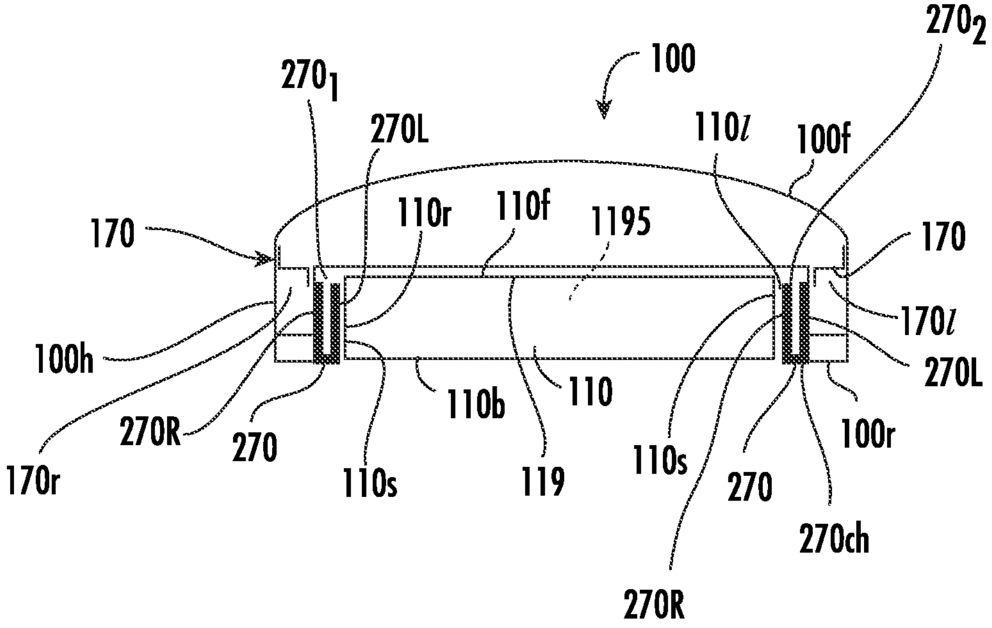
FIG. 3A is a lateral cross-section schematic illustration of an example base station antenna according to embodiments of the present invention.

Referring to FIG. 3A, the base station antenna 100 can include at least one active antenna module 110. The term "active antenna module" refers to a cellular communications unit comprising radio circuitry and associated antenna elements that are capable of electronically adjusting the amplitude and/or phase of the subcomponents of an RF signal that are output to different antenna elements or groups thereof. The active antenna module 110 comprises the radio circuitry and antenna elements (e.g., a multi-input-multi-output (mMIMO) antenna array) and may include other components such as filters, a, calibration network, antenna interface signal group (AISG) controller and the like. The active antenna module 110 can be provided as a single integrated unit or provided as a plurality of stackable units, including, for example, first and second sub-units such as a radio sub-unit (box) with the radio circuitry and an antenna sub-unit (box) with mMIMO antenna elements and the first and second sub-units stackably attach together in a front to back direction of the base station antenna 100, with the antenna unit closer to the front 100*f* (external radome) of the base station antenna 100 than the radio unit.

Figure 4A:
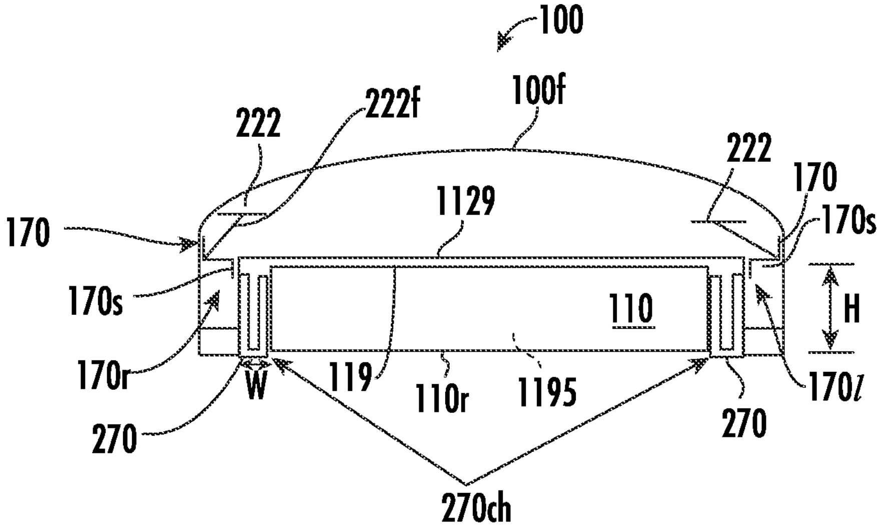
FIG. 4A is a lateral cross-section schematic illustration of another example of a base station antenna according to embodiments of the present invention.
Figure 4B:
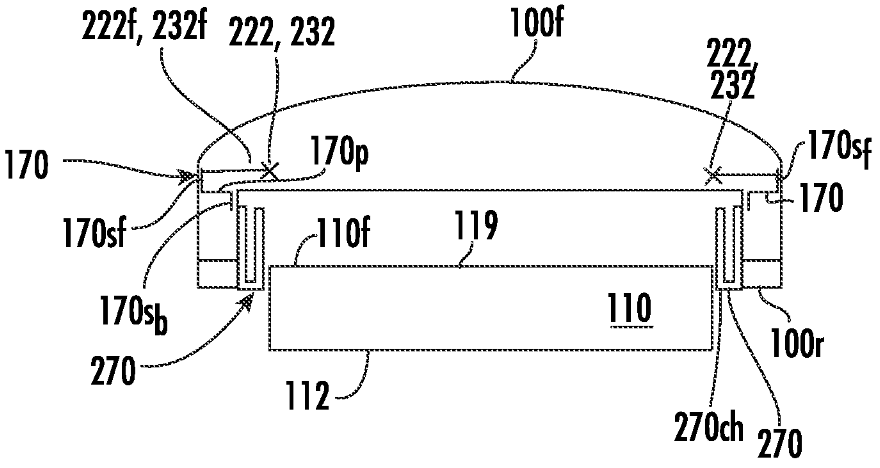
FIG. 4B is a lateral cross-section schematic illustration of an example base station antenna according to embodiments of the present invention.
Figure 5:
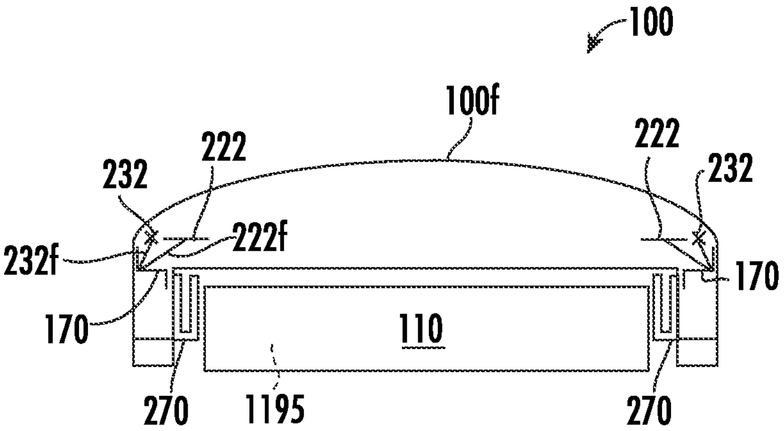
FIG. 5 is a lateral cross-section schematic illustration of yet another example base station antenna according to embodiments of the present invention.
Figure 20:
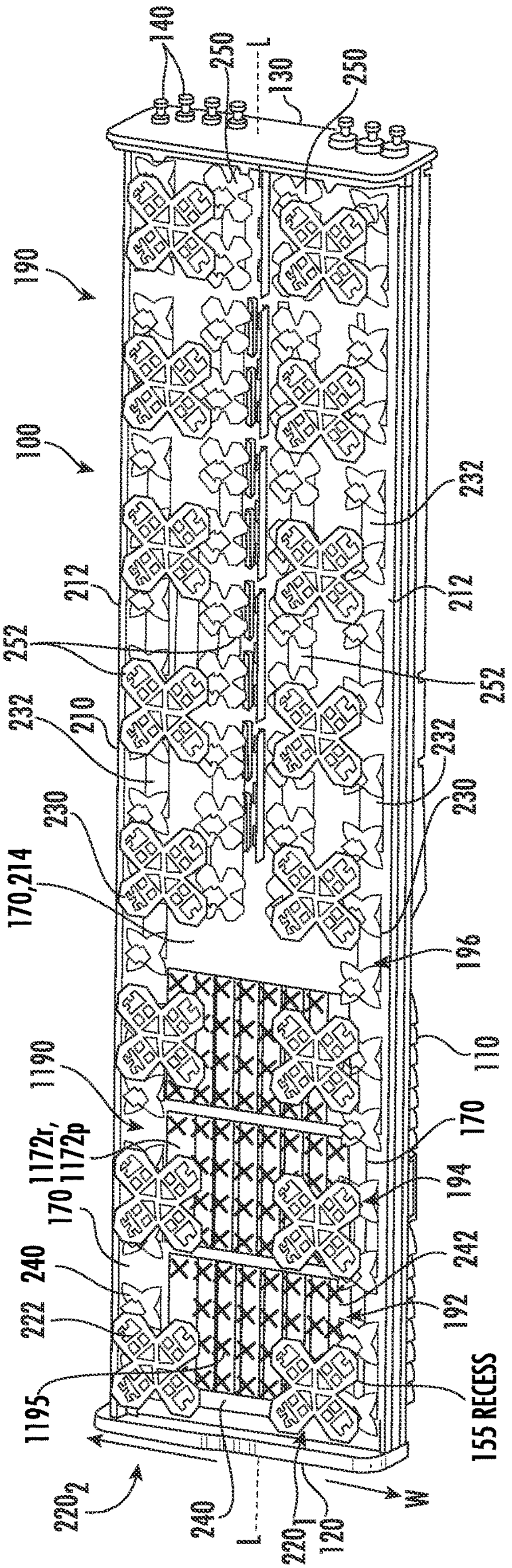
FIG. 20 is a rear, side perspective view of an embodiment of a base station antenna with the front (external) radome omitted according to embodiments of the present invention.

As will be discussed further below, the antenna housing 100*h* includes a passive antenna assembly 190 (FIG. 20). The term "passive antenna assembly" refers to an antenna assembly having radiating elements that are coupled to radios that are external to the antenna (typically remote radio heads that are mounted in close proximity to the base station antenna 100/housing 100*h*. The passive antenna assembly can comprise radiating elements such as one or both low band radiating elements 222 and/or mid-band or high band radiating elements 232 (FIGS. 4A, 4B, 5). The passive antenna assembly 190 is mounted in the base station antenna housing 100*h* and the base station antenna housing 100*h* can releasably (detachably) couple to one or more active antenna modules 110 that is/are separate from the passive antenna assembly 190.

Different active antenna modules 110 may be configured to have different radios, radiating elements or other components whereby the active antenna modules 110 can be different for different cellular service providers and even for the same cellular provider. The active antenna module 110 can be interchangeably replaced with another active antenna module 110 from the original equipment manufacturer (OEM) or from the same cellular communications service provider or from different cellular communications service providers. Thus, a plurality of different active antenna modules 110 that have different configurations, including different internal configurations and different external configurations, can be interchangeably coupled to the base station antenna housing 100*h*. The different active antenna modules 110 can each have the same exterior (perimeter) footprint and connectors or may have different exterior footprints and/or connectors. The different active antenna modules 110 can have different depth dimensions (front to back) and/or different width (lateral) dimensions. A respective base station antenna 100 can, for example, accept different active antenna modules 110 from different service providers at a field installation and/or factory installation site using different adapter members or other mounting configurations that allow the interchangeable field installation/assembly. The base station antenna 100/antenna housing 100*h* can thereby allow different active antenna modules 110 to be interchangeably installed, upgraded, or replaced. The base station antenna 100 can concurrently hold first and second active antenna units 110, one above the other, in some embodiments.

Still referring to FIG. 3A, the base station antenna 100 can include a reflector 170 that has right and left side reflector segments 170*r*, 170*l* (the orientation defined when viewed from a front 100*f* of the base station antenna 100) that extend in a longitudinal direction along opposing sides 110*s* of the active antenna module 110, shown as along corresponding right and left sides 110*r*, 110*l* of the active antenna module 110. The reflector 170 can be an extension of or coupled to a primary or main reflector 214 of the passive antenna assembly 190 (FIG. 20).

In some embodiments, the right and left side segments 170*r*, 170*l* can be spaced apart across a laterally and longitudinally extending window or recess 155 (FIG. 8C) in or on the rear 100*r* of the housing 100*h* that allows the active antenna module 110 to be received therethrough to position a front 110*f* of the active antenna module 110, typically comprising or defined by a radome 119, adjacent to or inside a rear of the housing 100*h* of the base station antenna 100.

Figure 3B:
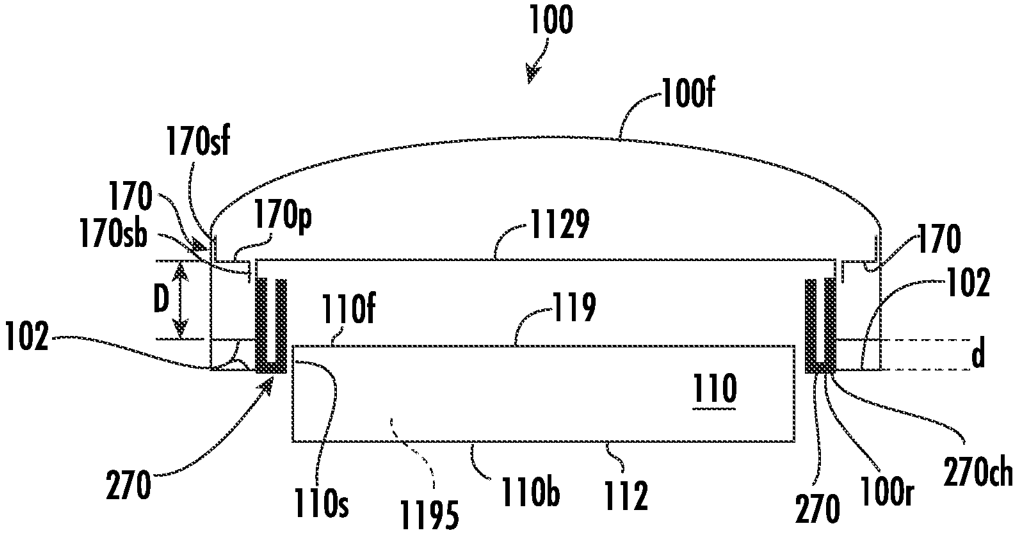
FIG. 3B is a lateral cross-section schematic illustration of another example base station antenna according to embodiments of the present invention.

FIG. 3B illustrates that the active antenna module 110 can project outward from the rear 100*r* of the base station antenna 100*h* while FIG. 3A illustrates that the rear 112 and/or back 110*b* of the active antenna module 110 may be flush with the rear 100*r* of the housing or terminate a short distance outward or inward (front to back direction) from the rear 100*r* of the housing 100*h*.

FIGS. 3B and 4B illustrate that the front 110*f* of the active antenna module 110 can extend a distance "d" in front of the rear 100*r* of the base station antenna 100*h*, where "d" is typically in a range of 0 inches (flush with the rear surface of the base station antenna housing) to 2 inches.

Figure 3C:
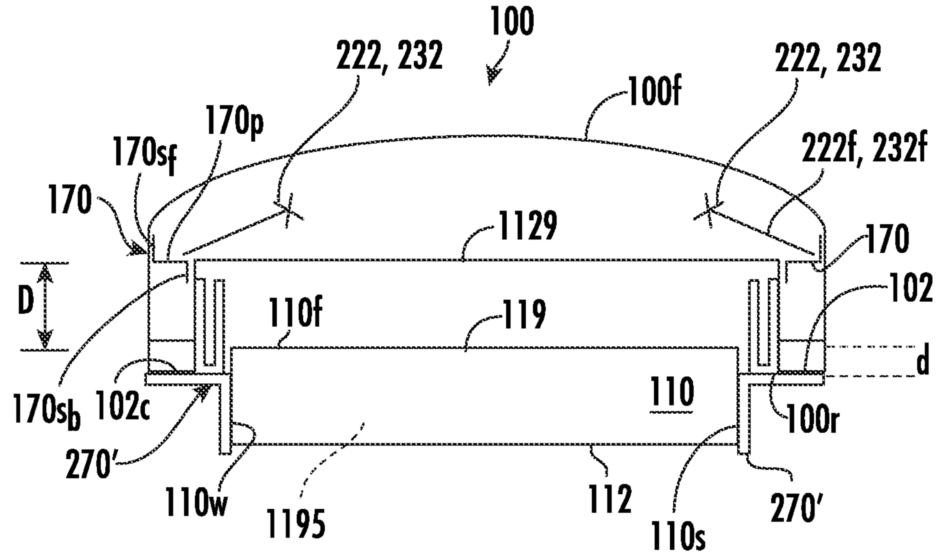
FIG. 3C is a lateral cross-section schematic illustration of another example base station antenna according to embodiments of the present invention.
Figure 3D:
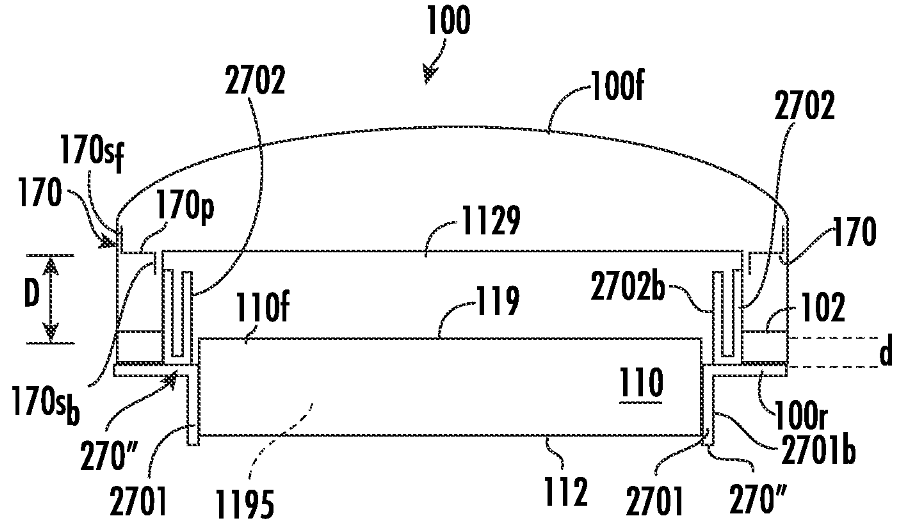
FIG. 3D is a lateral cross-section schematic illustration of another example base station antenna according to embodiments of the present invention.
Figure 3E:
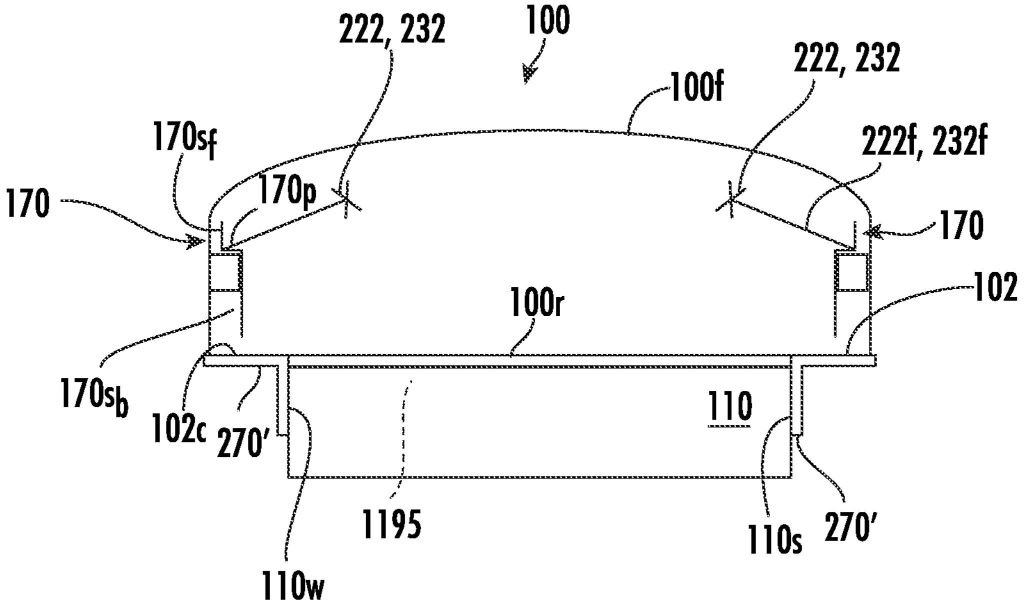
FIG. 3E is a lateral cross-section schematic illustration of another example base station antenna according to embodiments of the present invention.

FIG. 3E illustrates that the front 110*f* of the active antenna module 110 can reside a distance behind a maximal front to back extent of the rear surface 100*r* a distance that is typically in a range of about 0 inches to 1 inch and no recess aligned with the active antenna module 110 and spanning across the rear 100*r* of the base station antenna housing 100*h* is required.

In some embodiments, the position of the active antenna module 110 relative to the level of the passive reflector surface (front to back and or side to side) can provide a gap on the sides that can accommodate or provide coupling surfaces for the coupling brackets 270 and/or a mounting adapter bracket.

FIGS. 3B and 4B illustrate that the front 110*f* of the active antenna module 110 can extend a distance "D" behind the rear of the housing 100*h* and/or a laterally extending plane of the reflector 170, where "D" is typically in a range of 1-6 inches, more typically in a range of 2-5 inches.

FIG. 3C illustrates that the coupling bracket(s) 270' can be configured to have an "L" shaped body with a first segment or side of the "L" parallel to to an outer wall 110*w* of the active antenna module 110 and the second segment or side projecting perpendicularly outward therefrom. The coupling bracket 270' can be electrically coupled to both the passive antenna housing 100*h* and/or components therein as well as the active antenna module and/or components therein. The coupling can be provided by direct contact (galvanic) or capacitively via a dielectric therebetween (air or other dielectric material).

FIG. 3D illustrates that the coupling bracket 270" can comprise a first segment 2701 and a second segment 2702. The first segment can have an "L" shaped body 2701*b* and the second segment 2702 can have a "U" shaped body segment 2702*b*.

The long or short side of the "L" can extend adjacent to at least 50% of a length direction (defined in a use orientation as in a front to back direction) of a side wall 110*w*. The outer (side) wall 110*w* can define a segment of a (metal) chassis 110*s* of the active antenna module 110. The other of the long or short side of the "L" can be parallel to a coupling surface provided by the passive antenna housing 100*h*.

In some embodiments, the coupling surface 102*c* is provided by a rail 102 of the base station antenna housing 100*h*. The coupling surface 102*c* provided by the rail 102 can be external as shown or internal (FIG. 14) to the housing 100*h*. The coupling brackets 270, 270' can be configured to couple directly or indirectly to the passive antenna reflector 170, 214 or to a chassis of the base station antenna housing 100*h* without requiring the use of a rail.

The rails 102 can be provided as right and left side longitudinally extending and laterally spaced apart rails that are internal to the base station antenna housing 100*h* or external to the base station antenna housing 100*h*. In some embodiments, cooperating pairs of internal rails 102*i* and external rails 102*e* (FIG. 13) may be coupled together and used for structural rigidity and be configured to engage the coupling bracket(s) 270, 270'.

Referring to FIGS. 3A-3D, 4A, 4B, and 5, for example, the base station antenna 100 can include a plurality of spaced apart coupling brackets 270, 270', 270", with a first one $\mathbf{270}_1$ extending longitudinally along and positioned along a right side 110*r* of the active antenna module 110 and a right-side reflector segment 170*r* and a second one $\mathbf{270}_2$ extending longitudinally along and positioned on a left-side 110*l* of the active antenna module 110.

The coupling bracket(s) 270, 270', 270" can be configured to electrically couple a ground plane and/or reflector 170 of the base station antenna housing 100*h* with the active antenna module 110. The coupling bracket(s) 270, 270', 270" can be configured as a metal conductive member(s) that electrically couples to a side wall chassis 110*w* of the active antenna module 110.

The coupling bracket(s) 270, 270', 270" can be configured to electrically couple to the internal ground plane 1172*g* of the active antenna module 110 via the side wall 110*w* and/or chassis 110*s* to place the reflector 170 and the ground plane 1172*g* of the active antenna module 110 at a common electrical ground. The coupling bracket(s) 270, 270', 270" can be configured to provide RF isolation (isolation from backward radiation from radiating antenna elements such as, for example, radiating elements of the passive antenna assembly 190), high impedance and/or block current in one or more frequency band.

In some embodiments, the coupling brackets 270 can include or be configured to define RF chokes 270*ch*. The term "RF choke" refers to a circuit element that is configured to block or "choke" currents in one or more frequency bands. Each RF choke 270*ch*, can comprise a curvilinear channel, shown as a U-shaped channel in FIGS. 3A, 3B and 3D. The channel has an electrical path length (i.e., the sum of the lengths of each right and left side 270R, 270L and the back or bottom of the U-shape) that can correspond to a 180° phase shift at the center frequency of the frequency band at which at least one (array or set) of the radiating elements of the passive antenna assembly 190 radiates RF energy. Consequently, RF currents that are carried outwardly on the reflective surface of the RF choke 270*ch* may pass down a first side of the RF choke 270*ch*, along the bottom thereof and then back up the other (opposing second) side of the RF choke 270*ch*. As the RF signal at the top of the other side of the U-shaped channel of the RF choke 270*ch* is about 180° out-of-phase with the RF signal at the top of the inner side of U-shaped channel 270*ch*, these signals tend to cancel each other out. In some embodiments, each RF choke 270*ch* may be designed to choke RF signals in the operating frequency band of the low-band radiating elements included in base station antenna 100, although the RF chokes 270*ch* may be designed to choke RF energy in other frequency bands or in multiple frequency bands, as will be discussed herein. The RF chokes 270*ch* may reduce the amount of RF radiation that radiated rearwardly, and hence may advantageously increase the gain of the antenna and/or reduce interference.

The base station antenna 100 can include at least one radome positioned between the (passive) reflector 170 and the active antenna module 110. For example, referring to FIG. 4A, the active antenna module 110 can include a radome 119 at a front 110*f* thereof, that resides in front of a mMIMO antenna array 1195. The passive antenna assembly 190 can include a radome 1129 that resides in front of the radome 119 of the active antenna module 110. In some embodiments, the coupling brackets 270 comprising RF chokes 270*ch* can reside between the radomes 119, 1129, typically between parallel side segments thereof.

Thus, in some embodiments, the base station antenna 100 can be configured with a first radome 119 and a second radome 1129, spaced apart in a front to back direction. The first radome 119 can be part of the active antenna module 110 and be configured to seal the active antenna module 110. The second radome 1129 can be configured to be a skin or middle/intermediate radome 1129 and can be configured to seal the base station antenna housing 100*h* comprising the passive antenna assembly 190 at the receiving chamber 155 (FIG. 8C). The second radome 1129 can define a seal covering over the open receiving chamber 155 prior to coupling to the active antenna module 110. The second radome 1129 can have a rigid, semi-rigid (self-supporting shape) or a flexible configuration. The second or intermediate radome 1129 resides between the first radome 119 and the front of the housing **100*f*/external radome. When the active antenna module 110 is assembled to the housing 100*h*, both the first and second radomes 119, 1129 can be internal to the housing 100*h***.

FIGS. 3C, 4A illustrate that (the passive antenna assembly 190 of) the base station antenna 100 can include low band radiating elements 222 with respective angled feed stalks **222*f* projecting forward of the reflector 170, in front of the active antenna module 110, and extending laterally inward at an angle that is parallel to or that is between 20-80 degrees from horizontal. Note that the low-band radiating elements 222 may (partially) extend in front of the outer columns of high-band radiating elements 1195 of the active antenna module 110. Any of the feed stalk designs disclosed in U.S. Provisional Patent Application Ser. No. 63/087,451, filed Oct. 5, 2020 ("the '451 application") may be used to implement the angled feed stalks 222*f***. The entire content of the '451 application is incorporated herein by reference as if set forth in its entirety.

FIG. 4B illustrates that the passive antenna assembly 190 of the base station antenna 100 can include low band radiating elements 222 and/or mid-band radiating elements 232 with respective feed stalks **222*f*, 232*f* projecting laterally inward from a side segment 170*s* of the reflector 170 and forward of the reflector 170, in front of the active antenna module 110. The reflector 170 can include a forward side segment 170*sf* that connects to an end portion of a respective feed stalk and a rearward side segment 170*sb* that couples to the RF choke 270*ch*, the forward side segment 170*sf* can be separated from the rearward side segment 170*sb* by a middle segment 170 that is planar and can be orthogonal to the side segments 170*s*. The feed stalks 222*f*, 232*f* can be parallel to a main reflector 214 (extend straight) or may angle from the side segment 170*s* toward the front 100*f* of the base station antenna 100. Again, note that the low-band radiating elements 222 may (partially) extend in front of the outer columns of high-band (mMimo) radiating elements 1195 of the active antenna module 110. This configuration may allow improved spacing and/or alternative configurations of the front of the active antenna module 110**.

FIG. 5 illustrates that the passive antenna assembly 190 can also include additional radiating elements which can be mid-band radiating elements 232, (or high band radiating elements or both high and mid-band radiating elements) that can project forward of the active antenna module 110.

Figure 6A:
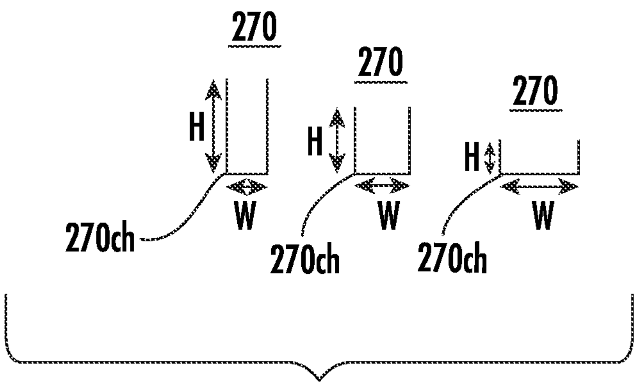
FIG. 6A is a schematic illustration of different RF choke configurations allowing for different size active antenna modules for coupling to the base station antenna according to embodiments of the present invention.

FIG. 6A illustrates that the coupling bracket 270 can be provided as RF chokes **270*ch* in different configurations with the same electric path length provided by different width and height dimensions, W, H, to operate at the same RF choke frequency band(s). Thus, the housing 100*h* can have a recess 155 with a fixed width that can receive active antenna modules 110 with different lateral extents or widths. The narrowest width modules 110 can use the wider RF chokes 270*ch* and those chokes 270*ch* reside between the active antenna module 110 and the side segments of the reflector 170. Choke covers and/or path extenders can be included in the RF chokes 270*ch* to reduce the overall size of the chokes and/or to improve the performance thereof, as discussed in U.S. Pat. No. 10,601,120 ("the '120 patent"), the contents of which are hereby incorporated by reference as if recited in full herein. Any of the RF choke designs disclosed in the '120 patent may be used to implement the RF chokes 270*ch***.

Figure 6B:
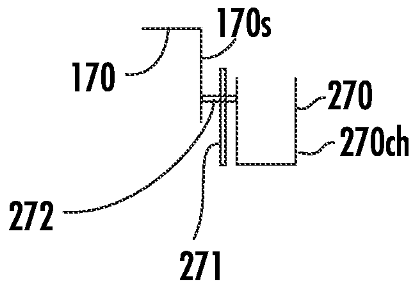
FIG. 6B is an enlarged schematic view of an interface of an RF choke and reflector according to embodiments of the present invention.

FIG. 6B illustrates that the coupling bracket 270 (shown in this embodiment as an RF choke **270*ch*) can be coupled to a side segment 170*s* of the passive reflector 170 using a dielectric member 271 such as a dielectric gasket, using a fastener 272. For example, a thin insulating gasket or spacer formed of, for example, mylar, may be interposed between the RF choke 270*ch* and the reflector surface 170*s*. In such embodiments, plastic rivets, screws or other fasteners may be used to connect the coupling bracket 270 to the reflector 170** to avoid direct metal-to-metal contact that could be a potential source of PIM.

In some embodiments, a dimple feature may be provided surrounding apertures for the fasteners. This dimple feature may help avoid direct metal-to-metal contact between the choke and the reflector.

While in many cases, where the coupling bracket 270 comprises an RF choke, the RF choke **270*ch* may only be designed to operate as a choke in the low-band frequency range, embodiments of the invention are not limited thereto. For example, in other embodiments, the RF choke 270*ch*** may be designed to operate as a choke in the mid-band frequency range or in the high-band frequency range.

Figure 6C:
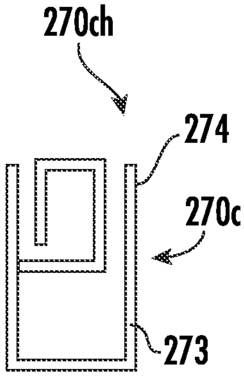
FIG. 6C is an enlarged schematic view of an example multi-band RF choke configuration according to embodiments of the present invention.

FIG. 6C illustrates an alternative RF choke **270*ch* that is a multi-band RF choke that blocks currents in at least two different frequency ranges such as both low band and high-band. The RF choke 270*ch* can be configured as a choke-within-a-choke (CWC) assembly 270*c*. The CWC assembly 270*c* can include a first choke 273 configured as a first low-band choke and a second choke 274 configured to be a higher-band choke. The first choke 273 may be configured as an at least three-sided choke, and the second choke 274 may be configured as an at least four-sided choke and may have more sides than the first choke 273**. For additional discussion of example chokes within chokes, see, U.S. patent application Ser. No. 17/286,953 ("the '953 application"), which corresponds to WO2020/086303, the contents of which are hereby incorporated by reference as if recited in full herein. Any of the choke within a choke designs illustrated in the '953 application or other designs, may be used to implement the RF chokes used in the antennas according to embodiments of the present invention disclosed herein.

Figure 7A:
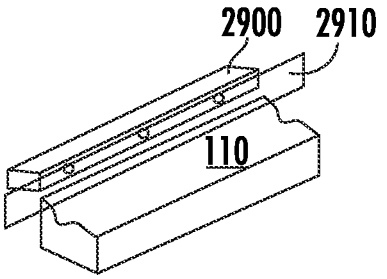
FIG. 7A is a side perspective illustration of an example mounting configuration of an active antenna module for coupling to a base station antenna according to embodiments of the present invention.
Figure 7B:
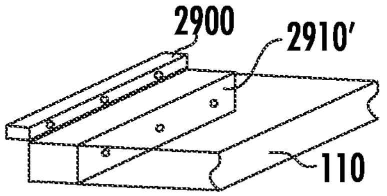
FIG. 7B is a side perspective illustration of another example mounting configuration of an active antenna module for coupling to a base station antenna using the same mounting interface for the base station antenna and a different mounting interface for attaching to a respective active antenna module according to embodiments of the present invention.

FIGS. 7A and 7B illustrate of an example mounting configuration of an active antenna module HO for coupling to a base station antenna housing **100*k* using the same mounting interface 2900 for the base station antenna 100 and a different mounting interface 2910 (attached to the housing mounting interface 2900) for attaching to a respective active antenna module 110 according to embodiments of the present invention. Thus, the housing mounting interface 2900 can be the same and attach to different configurations of the mounting interface 2910, 2910' one of which may be longer or shorter or wider than another Thus, the housing mounting interface 2900 can fit consistently to the passive antenna/housing 100*h* and can attach to different configurations of the active antenna module mounting interface 2910, 2910' residing between the inner side of the mounting interface 2900 and different active antenna modules 110**.

Figure 7C:
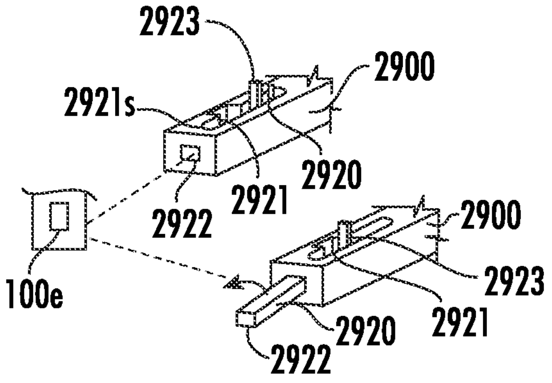
FIG. 7C is a partial side perspective schematic illustration of a lock configuration for locking the active antenna module to a base station antenna according to embodiments of the present invention.
Figure 7D:
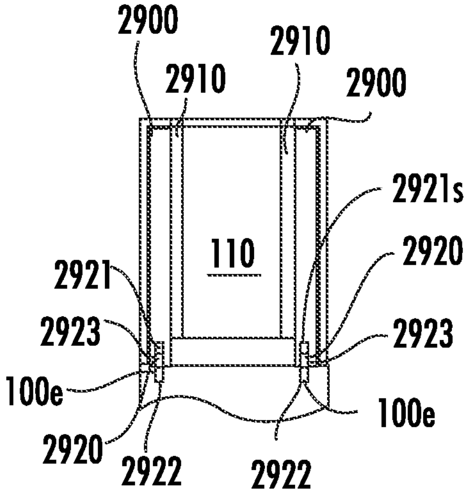
FIG. 7D is a partial back view of a base station antenna illustrating the mounting interface shown in FIG. 7C in a lock position and engaged to the base station antenna.

Referring to FIGS. 7C and 7D, an example lock configuration for locking the active antenna module 110 to a base station antenna 100 is shown. In this example embodiment, a slidable lock member 2920 is shown in the housing mounting interface 2900. The slidable lock member 2920 can be held in a longitudinally extending channel 2921. The lock member 2920 can have a first position whereby the end portion 2922 is recessed in the channel 2921 and a second position whereby the end portion 2922 is extended and outside the channel 2921. The base station antenna housing **100*h* can have an entry channel 100*e* that slidably receives the lock member 2920 as it extends out of the channel 2921. An external user interface portion 2923 can be provided to allow a user to slide the lock member 2920. A longitudinally extending slot 2921*s* can allow the user interface portion to slide relative to the channel 2921. The slot 2921*s* can have a locking segment 2921*l* that is orthogonal to the slot 2921*s* to allow a user to lock the lock member 2920 at the fully extended and/or locked position. FIG. 7D is a partial back view of the base station antenna 100 illustrating the lock member 2920** in position and engaged to the base station antenna.

Once extended, the user interface segment can be moved laterally to lock the lock member 2920 at a desired longitudinal position. In some embodiments, the user interface can be configured to allow a user to pivot the lock member 2920 (shown by the arrows in FIG. 7C) to place the end portion in a different orientation for a keyed entry and/or locked configuration with the base station antenna housing. For example, the end portion 2922 of the lock member 2920 can have a first orientation and a second orientation and the entry channel **100*e* (or 2903, FIG. 7E) and/or inwardly positioned portion thereof can have a shape that may only accept the end portion 2922** in the second orientation.

Figure 7E:
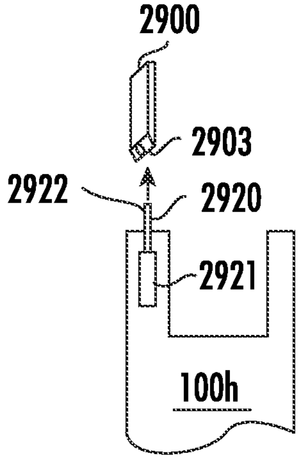
FIG. 7E is a partial back view of an example base station antenna illustrating another embodiment of a lockable mounting interface according to embodiments of the present invention.

Referring to FIG. 7E, it is also noted that the lock member 2920 and associated components, including slot **2921*s* can be provided in the base station antenna housing 100*h* and the entry channel 2900*e* for receiving the end portion 2922 of the lock member can be provided on the mounting interface 2900 of the active antenna module 110. Other mounting interfaces/configurations, including keyed or matable configurations may be used to facilitate proper alignment to facilitate assembly and tolerance issues arising from different size active antenna modules 110 to a universal base station antenna housing 100*h***.

During installation, the end portion 2922 of the lock member 2920 can be recessed inside the channel 2921. Typically, only once in position on the back of the antenna housing **100*h* and aligned with the entry channel 100*e* or 2903 can the lock member 2920** be extended to the locked position.

Figure 8A:
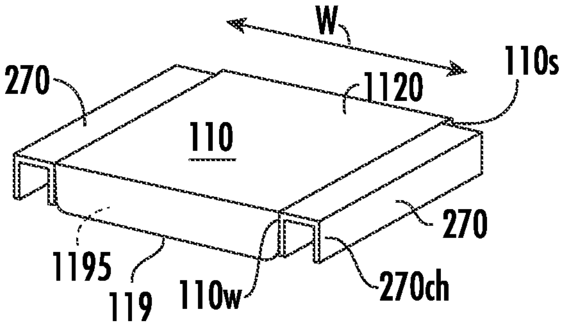
FIG. 8A is a back, perspective view of an example active antenna module according to embodiments of the present invention.
Figure 8B:
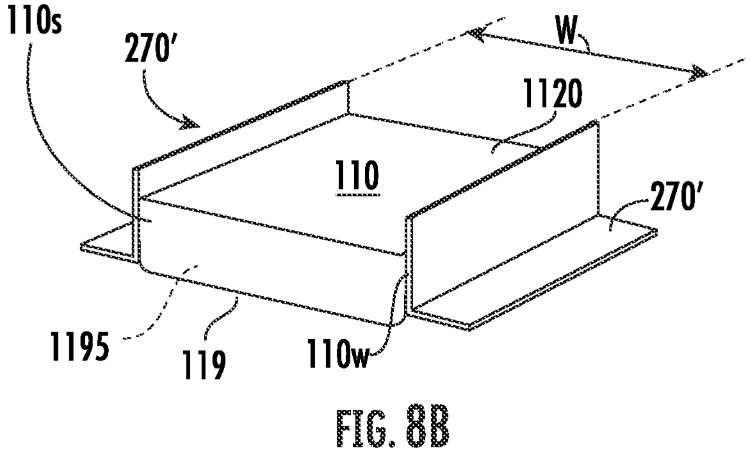
FIG. 8B is a back, perspective view of another example of an active antenna module according to embodiments of the present invention.
Figure 8C:
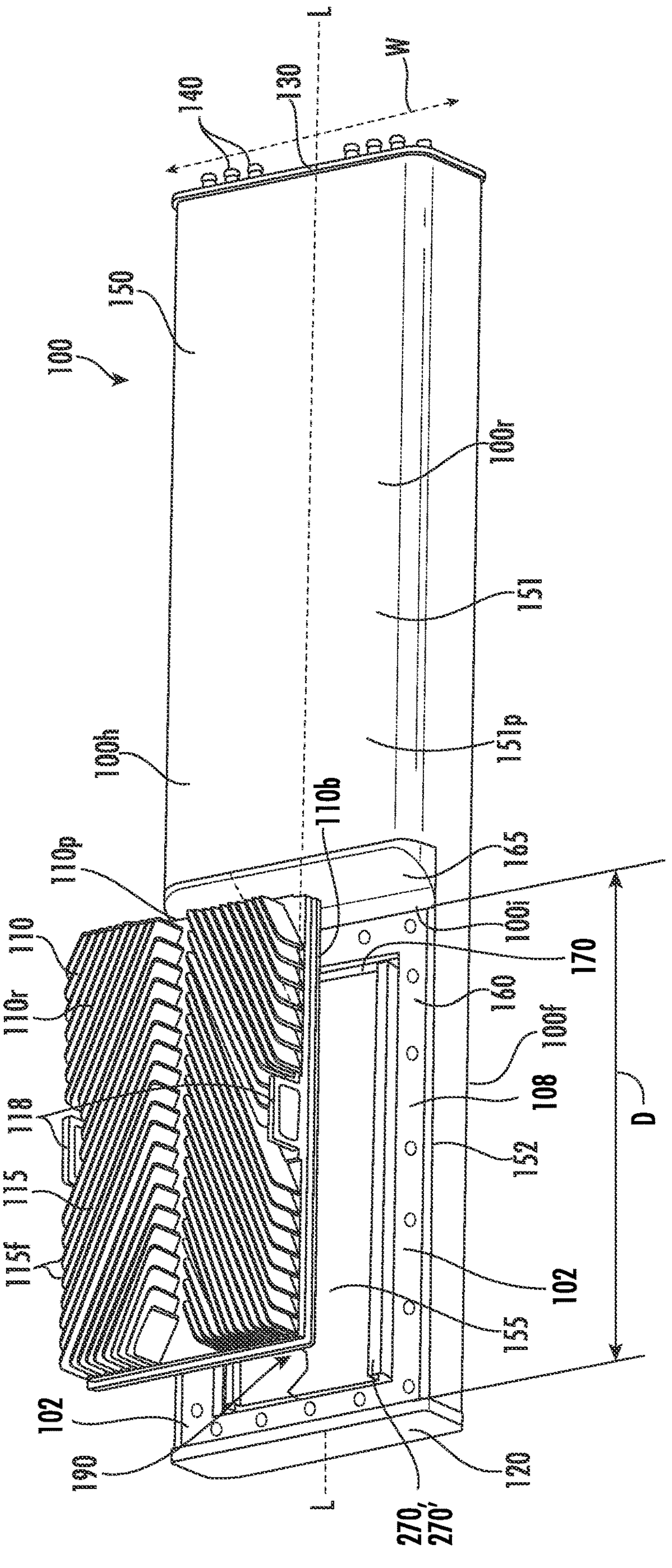
FIG. 8C is a back perspective view of an example base station antenna with a passive antenna assembly and an active antenna module according to embodiments of the present invention.
Figure 8D:
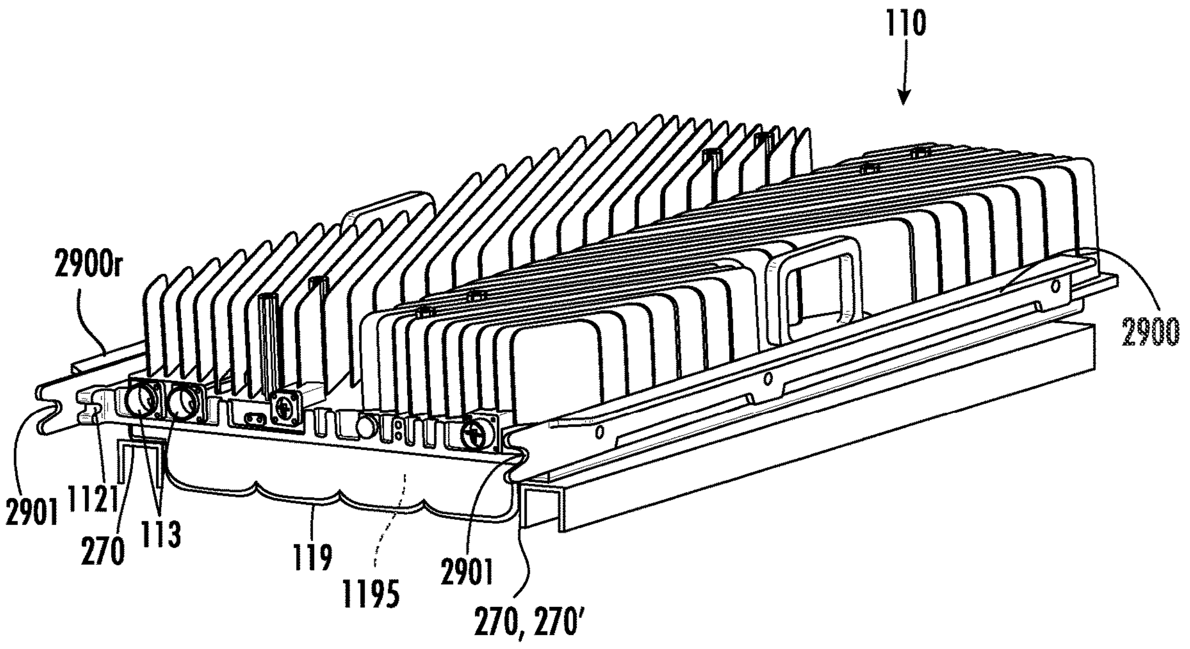
FIG. 8D is a back perspective view of an active antenna module according to embodiments of the present invention.

FIGS. 8A and 8B illustrate that the coupling brackets 270, 270' can be coupled to longitudinally extending side walls **110*w* of the active antenna module 110, before or after assembly to the base station antenna 100 allowing a user/installer to select an appropriate width/size RF choke 270*ch* (FIG. 6A) or “L” shaped body 270', based on a width W of the active antenna module 110 to fit adjacent to a rear or back surface of the housing 100*h*, optionally within a recess 155 of a “universal” base station antenna housing 100*h***.

It is contemplated that in some embodiments (FIG. 3E), the back surface **100*r* of the housing 100*h* can be closed with a constant outer surface profile (the same front to back dimension over its length and width dimensions) and does not require a recess to receive the active antenna module 110, which can be positioned closely adjacent to a plane of the rear surface. The term “universal” means that the housing 100*h* can accommodate different footprints of different active antenna modules 110**.

FIG. 8C illustrates that the coupling brackets 270, 270' can be coupled to the rails 102 and/or corresponding reflector side segments **170*s* before the active antenna module 110** is installed thereto.

Different part numbers of the same base station antenna housing **100*h* can be provided with different size, e.g., widths of the short side of the L (FIG. 3C) or of the RF chokes 270*ch* (FIG. 6A) to match the target active antenna module 110 for appropriate assembly matching the module 110 to the base station antenna housing 100*h*** in the field or at an OEM site.

It is also noted that coupling brackets 270, 270', 270" can be provided that extend laterally along a bottom and/or top of the recess 155 (not shown) with or as an alternative to the longitudinally extending coupling brackets.

FIG. 8C illustrates that the coupling brackets 270, 270' can be mounted in front of mounting brackets 2900 which can couple to mounting members on the base station antenna housing **100*h*. As shown, the mounting brackets 2900 include an open fork end 2901 facing a back 110*b* of the active antenna module 110. The mounting brackets 2900 may comprise rails 2900*r* that couple to internal and/or external rails 102 of the housing 100*h* of the base station antenna 100** in some embodiments.

Figure 8E:
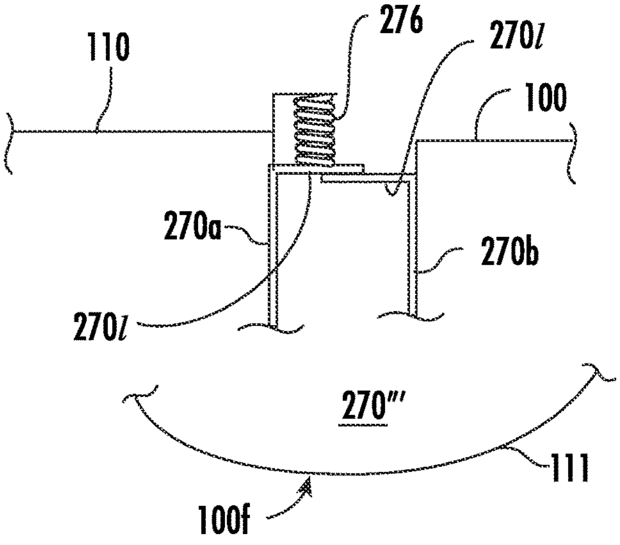
FIG. 8E is a schematic cross-section of another embodiment of an RF choke assembly according to embodiments of the present invention.

FIG. 8E illustrates that the coupling bracket 270' can be configured as an RF choke **270*ch* that can be provided as a first member 270*a* and a second member 270*b* that couple together upon assembly of the active antenna module 110 to the housing 100*h* of the base station antenna 100. The first member 270*a* can be attached to the active antenna module 110 and the second member 270*b* can be attached to the housing 100*h*. Upon assembly, the first and second members 270*a*, 270*b* are configured to electrically couple either via abutting contact or capacitively. Each member 270*a*, 270*b* can have an “L shape”. One or both members 270*a*, 270*b* may be configured with a biasing member 276 such as a spring or resilient member that is configured to force a segment thereof toward the other member to provide a sufficiently secure abutting contact across at least a portion of a respective laterally extending segment 270*l*. The laterally extending segments 270*l*** may at least partially overlap as shown to provide the desired width dimension.

Figure 9A:
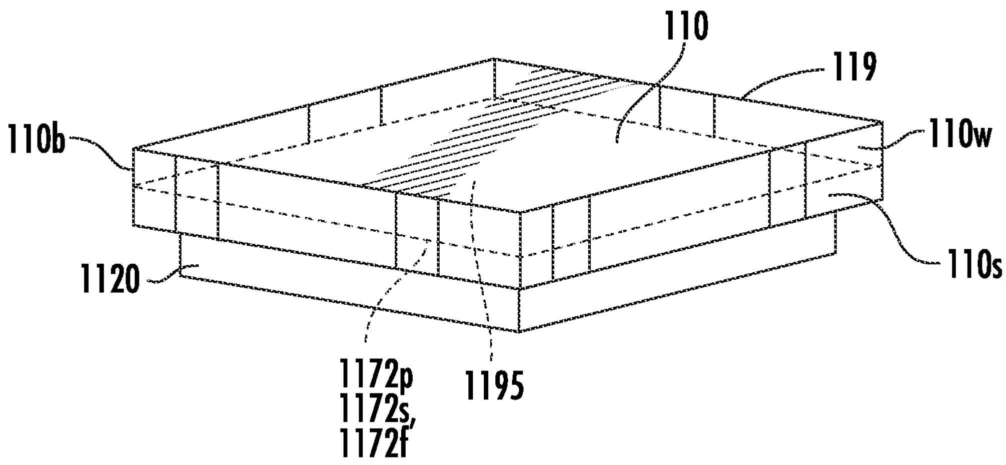
FIG. 9A is a front, side perspective schematic illustration of another example active antenna module according to embodiments of the present invention.

FIG. 9A is a front, side perspective schematic illustration of another example active antenna module according to embodiments of the present invention. The active antenna module 110 can be galvanically and/or capacitively coupled to one or more components of the passive antenna assembly 190 of the base station antenna 100, typically through the radome 119 of the active antenna module 110 and optionally also through an internal radome 1129 of the passive antenna assembly 190 of the base station antenna 100. For example, the active antenna module 110 can include at least one conductive member 1172 that can be galvanically and/or capacitively coupled to the reflector 170 of the passive antenna assembly 190.

The reflector 170 and/or main reflector 214 of the passive antenna assembly 190 in the base station antenna 100 typically comprises a sheet of metal and is maintained at electrical ground. It acts to redirect RF radiation that is emitted backwardly by the radiating elements in the forward direction, and also serves as a ground reference for the radiating elements. When the active antenna is configured as a separate active antenna module 110, the active antenna module 110 can be electrically coupled, upon assembly to the base station antenna housing **100*h*, to the reflector 170 of the passive antenna assembly 190 so that the reflector 170 of the passive antenna assembly 190 and one or more components of the active antenna module 110** are at a common electrical ground reference.

The at least one conductive member 1172 of the active antenna module 110 can include one or more of an outer side wall **110*w* and/or sidewall of the chassis 110*s*, a conductive frame 1172*f* extending over the mMIMO array 1195 (FIG. 9B), optionally a reflector 1172*r*** behind the mMIMO array

1195 or a ground plane 1172*g* of a multi-layer printed circuit board 1172*p* behind the mMIMO array 1195.

Figure 10A:
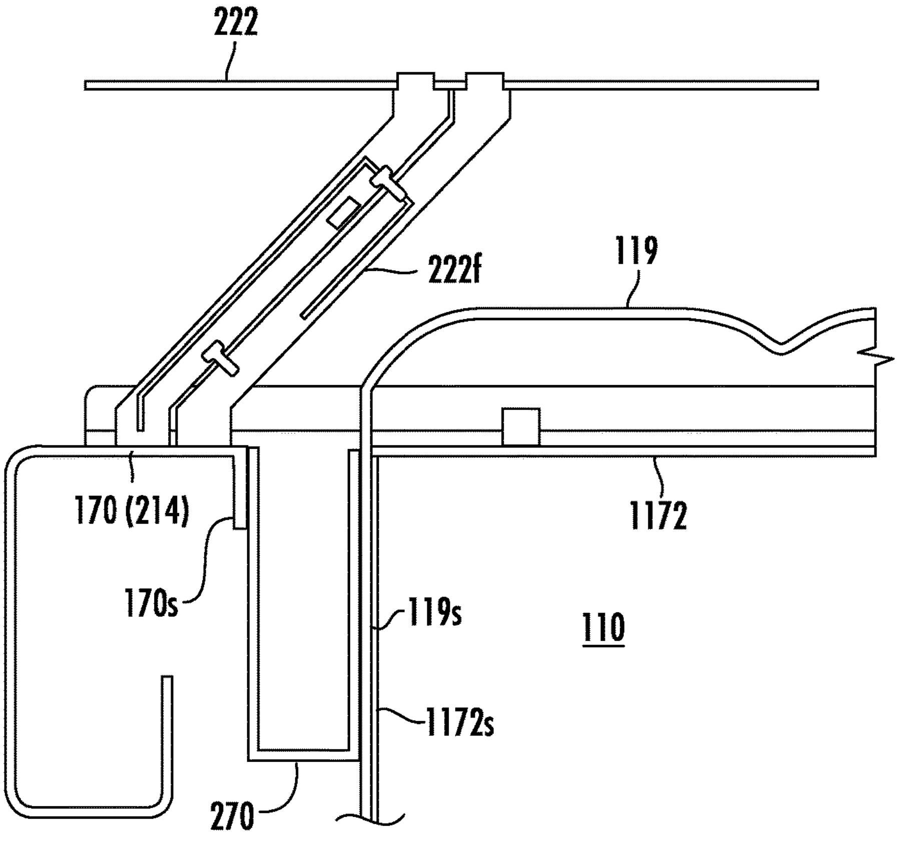
FIG. 10A is an enlarged simplified, front partial section view of one side of a base station antenna with a first reflector separated from the active antenna module by at least one radome according to embodiments of the present invention.

FIG. 10A illustrates the use of a coupling bracket 270, shown configured as an RF choke 270*ch*, between a reflector segment 170*s* and a radome segment 119*s* of the active antenna module 110. In this embodiment, the coupling portion of the reflector segment 170*s* is parallel to the sidewall of the radome segment 119*s*.

Figure 10B:
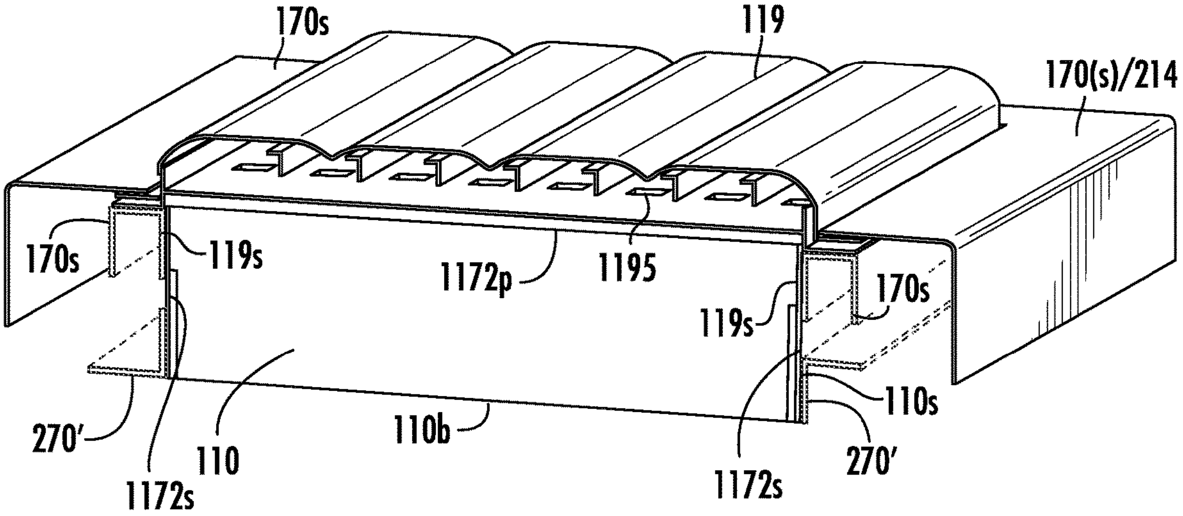
FIG. 10B is an enlarged simplified, side perspective partial section view of a base station antenna according to embodiments of the present invention.

FIG. 10B illustrates that no RF choke 270*ch* is required between the reflector segment 170*s* and the radome segment 119*s*. In other words, the RF chokes 270*ch* may be omitted in some embodiments. FIG. 10B also illustrates that the coupling member 270' can have the L-shaped body discussed above. In the orientation shown, the left side positions the "short" side of the L further away from the front 100*f* of the base station antenna housing 100*h* than the coupling member 270' shown on the right side. Typically, a common position of the short side of the L-shaped body is used and the two example orientations are shown (one on each side) together in FIG. 10B for ease of discussion.

Figure 11:
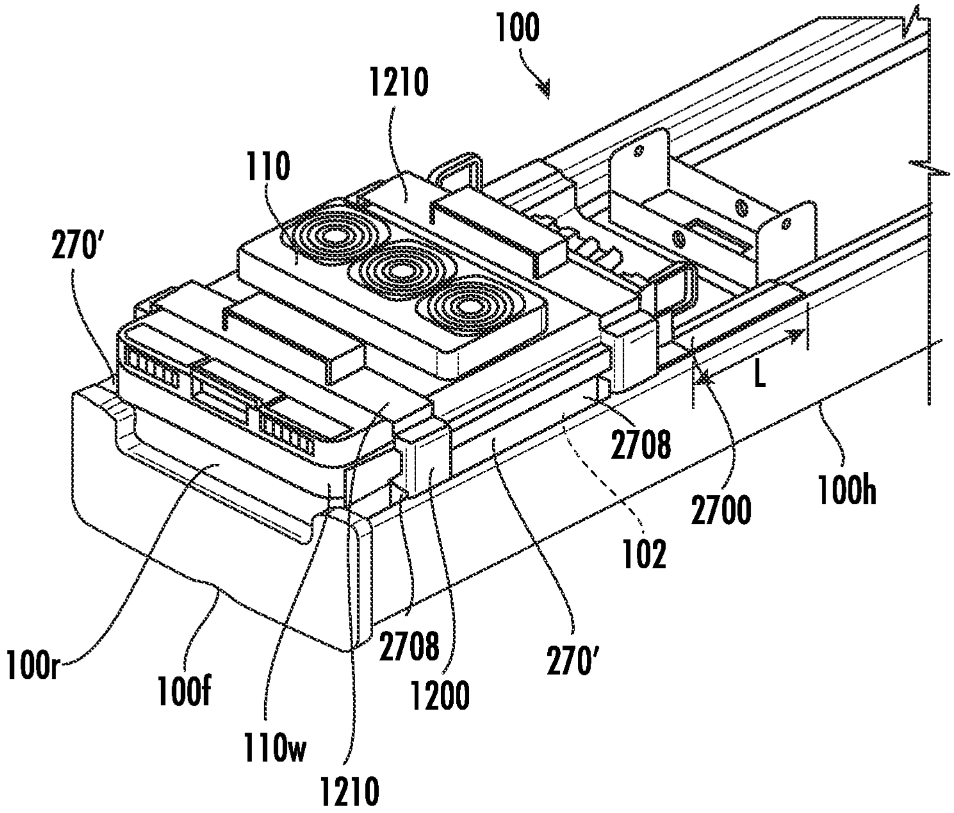
FIG. 11 is a back, side perspective view of a base station antenna comprising an active antenna module according to embodiments of the present invention.
Figure 17:
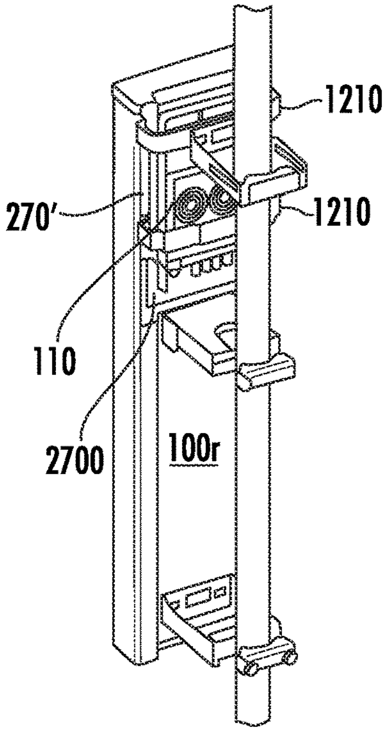
FIG. 17 is a back, side perspective view of a base station antenna with an active antenna module positioned on a support pole according to embodiments of the present invention.

Turning now to FIG. 11, a base station antenna 100 is shown with the base station antenna housing 100*h* and an active antenna module 110 attached to a rear 100*r* of the housing 100*h* using at least one coupling bracket 270'. FIG. 11 illustrates that the at least one coupling bracket 270' comprises right and left side coupling brackets 270'. The coupling brackets 270' can have laterally extending cutouts 2708 that surround a portion of a perimeter of respective outwardly (rearwardly projecting) mounting tabs 1200. The mounting tabs 1200 can support mounting brackets 1210 that can be used to mount to mounting structures such as poles (FIG. 17).

As also shown in FIG. 11, a laterally extending bracket 2700 can extend across a rear surface of the housing 100*h*, under and adjacent the active antenna module 110. The laterally extending bracket 2700 can be electrically conductive and can be coupled to each of the right and left side coupling brackets 270' and/or to the housing 100*h*, optionally via rails 102. The laterally extending bracket 2700 can be provided in different longitudinal lengths L to fit different size active antenna modules 110.

In some embodiments, the coupling brackets 270' can project outwardly from and couple to the rails 102.

Figure 12A:
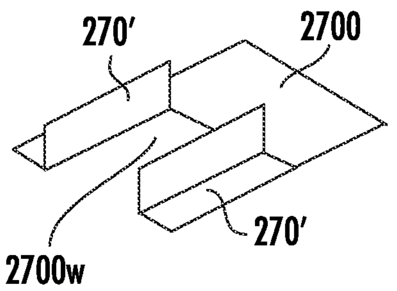
FIG. 12A is a schematic front, side perspective view of an example coupling bracket configuration according to embodiments of the present invention.

Referring to FIG. 12A, the coupling bracket 270' can be provided as an integral member such as a unitary, monolithic body, comprising right and left side longitudinally extending coupling brackets 270' and at least one laterally extending bracket 2700 that together define a window 2700*w* that receives and at least partially surrounds the active antenna module 110.

Figure 12B:
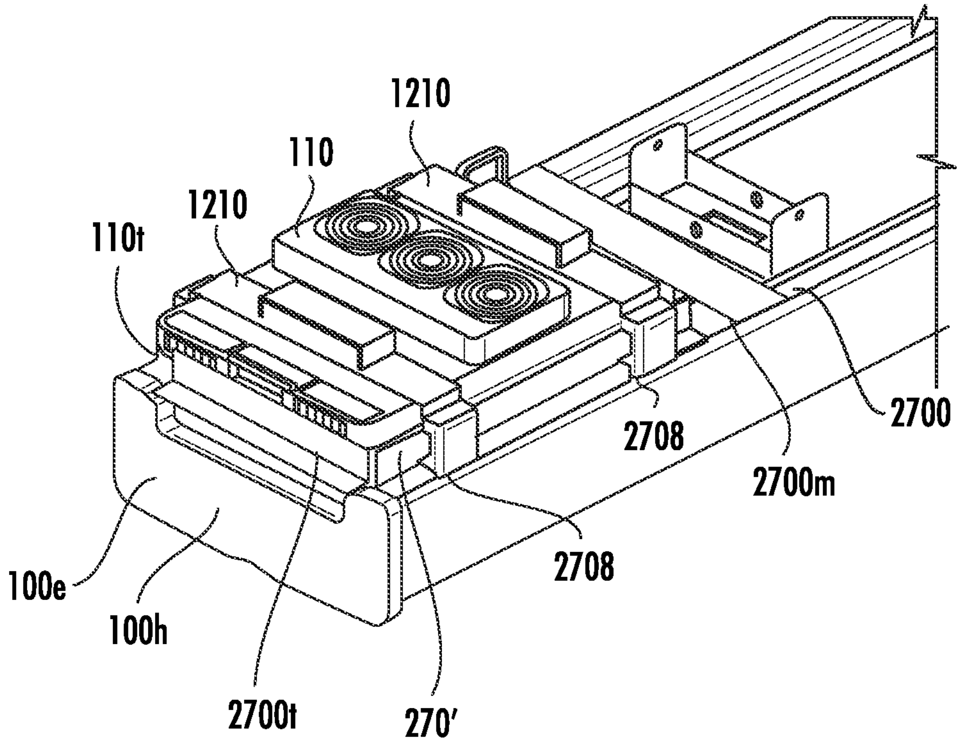
FIG. 12B is a back, side perspective view of another example of a base station antenna comprising an active antenna module according to embodiments of the present invention.

FIG. 12B, illustrates that the base station antenna 100 can have two laterally extending brackets that extend across at least a major portion of a width dimension thereof, a first one 2700*m* under the active antenna module 110 and a second laterally extending bracket 2700*t* can be provided across a top of the active antenna module and housing 100*h*. The second laterally extending bracket 2700*t* can have an "L" shaped body in some embodiments with one segment thereof configured to electrically couple to an outer wall of the active antenna module 110. For example, the laterally extending bracket 2700*t* can electrically couple to a top wall 110*t* of the active antenna module 110. The laterally extending bracket 2700*t* can be provided by the end cap 100*e* and can be slidably mounted to the housing 100*h*, after the active antenna module 110 is in position, in some particular embodiments.

Figure 13A:
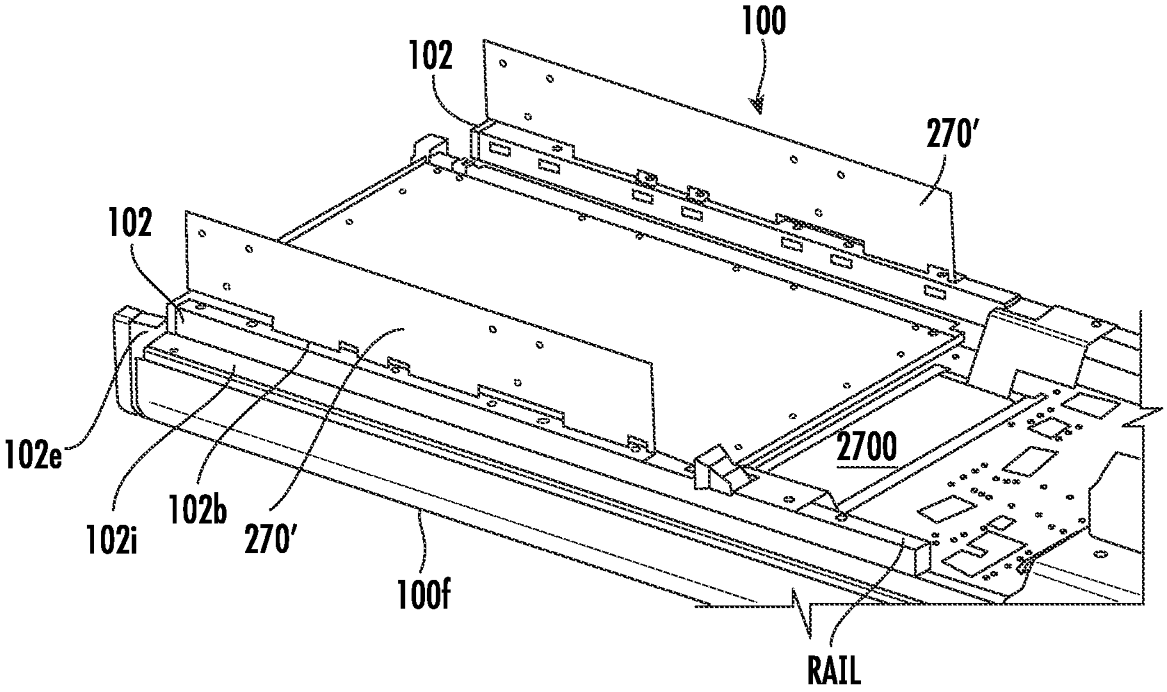
FIG. 13A is a back, side perspective view of a base station antenna configured to couple to an active antenna module according to embodiments of the present invention.

Referring to FIG. 13A, the rail 102 (internal 102*i* or external 102*e*) can be configured to have a folded, bent or otherwise shaped segment 102*b* that projects outwardly to define the coupling bracket(s) 270'.

Figure 13B:
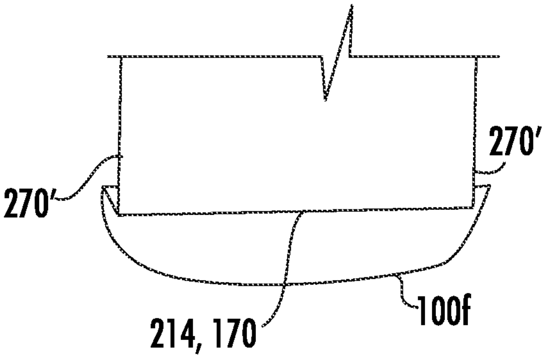
FIG. 13B is a schematic lateral section view of an example coupling bracket configuration according to embodiments of the present invention.

FIG. 13B illustrates that the reflector 170, 214 can be configured to have a bent segment that projects outwardly and resides outside the radome/rear surface 100*r* and defines the coupling bracket 270'.

Figure 14:
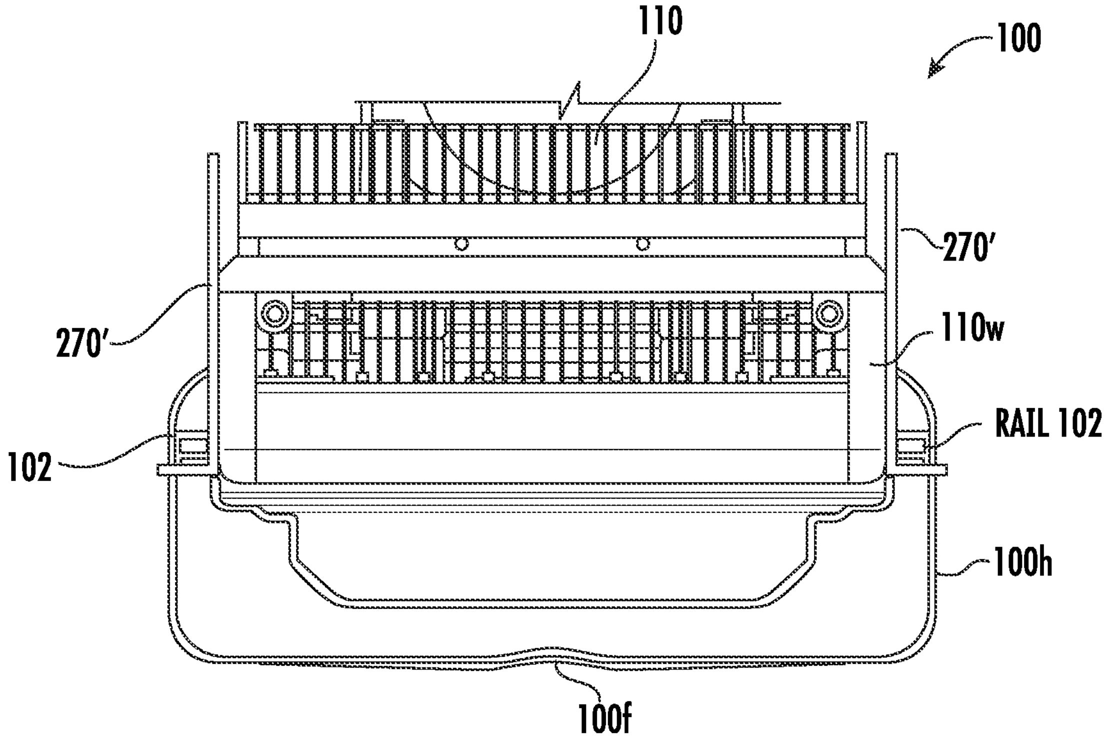
FIG. 14 is a simplified, lateral section view of a base station antenna comprising an active antenna module according to embodiments of the present invention.

FIG. 14 illustrates that the coupling bracket 270' can be coupled to or defined by a guide rail 102 to which the active antenna 110 mounts to. FIG. 14 also illustrates that the long side of the "L shaped body" can reside adjacent the outer wall 110*w* of the active antenna module. The short side of the "L shaped body" can reside inside the antenna housing 100*h* in front of the rail 102.

Figure 15:
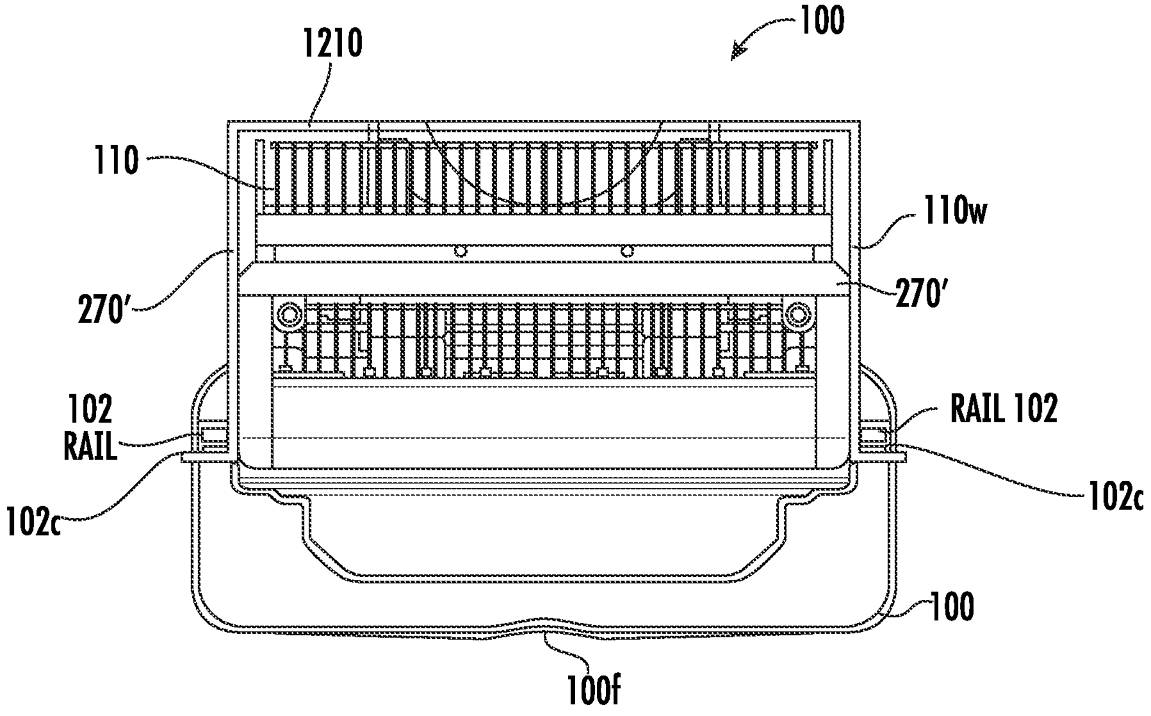
FIG. 15 is a simplified, lateral section view of a base station antenna comprising an active antenna module according to embodiments of the present invention

FIG. 15 illustrates that the coupling bracket 270' can be configured define the mounting bracket 1210 that is used to mount the base station antenna 100 to a mounting structure such as a pole (FIG. 17). That is, the mounting bracket 1210 can be coupled to pairs of right and left side longitudinally extending coupling brackets 270' or be formed to be integral therewith.

Figure 16:
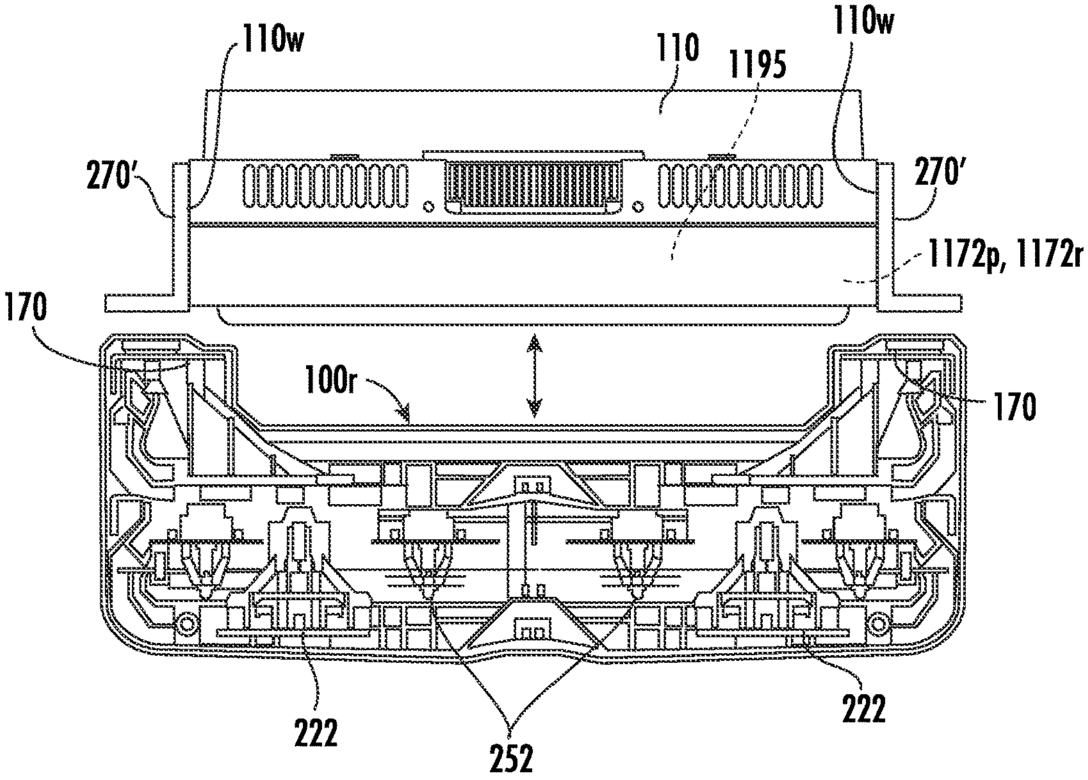
FIG. 16 is an end view of an example active antenna module and base station antenna housing (the latter shown in simplified, partial cutaway view) according to embodiments of the present invention.

FIG. 16 illustrates that the coupling brackets 270' can be coupled to the active antenna module 110 and to the rear 100*r* of the base station antenna housing 100*h*. The base station antenna housing 100*h* can comprise radiating antenna elements and the reflector 170 as discussed above. The active antenna module 110 can comprise a mMIMO array 1195 of radiating antenna elements. The coupling brackets 270' can be configured to position the reflector 170 a suitable distance from the ground plane of a printed circuit board 1172*p* of the active antenna module 110, optionally comprising a reflector 1172*r*, e.g., a distance in a range of about 0-50 mm, in some embodiments, while electrically coupling them together to provide a common ground.

Figure 18:
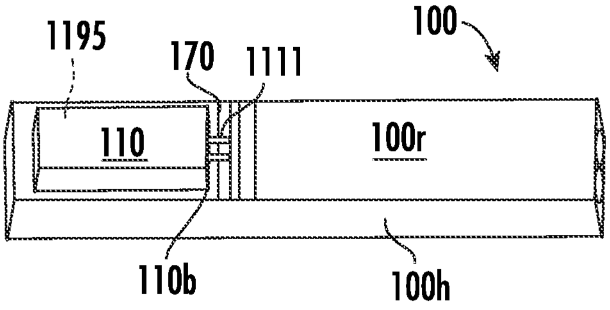
FIG. 18 is a schematic illustration of a base station antenna showing a reflector galvanically coupled to the active antenna module according to embodiments of the present invention.

FIG. 18 illustrates that the back 110*b* of the active antenna module 110 can be galvanically coupled to the reflector 170 by, for example, using fasteners 1111 such as POGO pins or other spring contacts or screws that extend through the reflector segment 170*s* to electrically connect to the conductive member(s) 1172 of the active antenna module 110 to thereby connect the passive reflector 170 and either an active antenna reflector 1172*r* or a ground plane 1172*g* of the printed circuit board 1172*p* to have a common ground plane or reflector plane. The fasteners 1111 can extend longitudinally as shown or laterally or fasteners can be provided with one or more that extends laterally and one or more that extends longitudinally (not shown).

Embodiments of the present invention electrically couple the passive reflector 170 to components in the active antenna module 110 to achieve a common ground reference.

The passive reflector 170 (214) and one or more of the conductive components 1172 of active antenna module 110 can be capacitively coupled together, and thus the metal reflector 170 can be physically spaced apart/separated from the conductive member(s) 1172. Collectively, these features can allow a) field replacement of the active antenna module 110 and b) an interleaving of active/passive elements without increasing the overall width of the base station antenna housing 100*h*.

The base station antenna 100 can have at least one radome 119 interposed between the reflector 170 and the conductive member(s) 1172 in some embodiments.

In some embodiments, a foil and/or a metallized surface coating or the like can be provided on or between one or more coupling surfaces of reflector 170, conductive member 1172(*s*) and/or radomes 1129 and 119 to improve capacitive coupling, where desired or used. The radome 119 of the active antenna module 110 can be a patterned radome with a series of laterally spaced apart peak and valley segments to reduce coupling of adjacent rows of antenna elements and/or otherwise facilitate performance. Further description of patterned radomes can be found in co-pending U.S. Provisional Patent Application Ser. No. 63/083,379, the contents of which are hereby incorporated by reference as if recited in full herein.

Referring again to FIG. 10A, one or more radiating element 222 can be positioned to extend over both the first (passive module) reflector 170(214), the second (active module) reflector 1172*r* and radome 119 of the active antenna module 110 according to embodiments of the present invention. The first (passive) reflector 170(214) can be parallel with the second (active) reflector 1172*r* or printed circuit board 1172*p*. A lip or other shaped outer perimeter side segment 119*s* of the radome 119 can extend laterally and longitudinally under or over the side segment 170*s* of the first reflector 170(214).

FIG. 10B illustrates that the conductive member 1172 can have a laterally extending side segment 1172*s*. The side segment 119*s* of the radome 119 can extend between a side segment 1172*s* of the conductive member 1172 and the adjacent segment of the first reflector 170*s*. The reflector 170(214) and conductive member 1172 can be capacitively coupled via the radome 119. The radome 119 can define a dielectric or be configured to provide an air gap space or both to facilitate or provide the capacitive coupling.

Figure 19A:
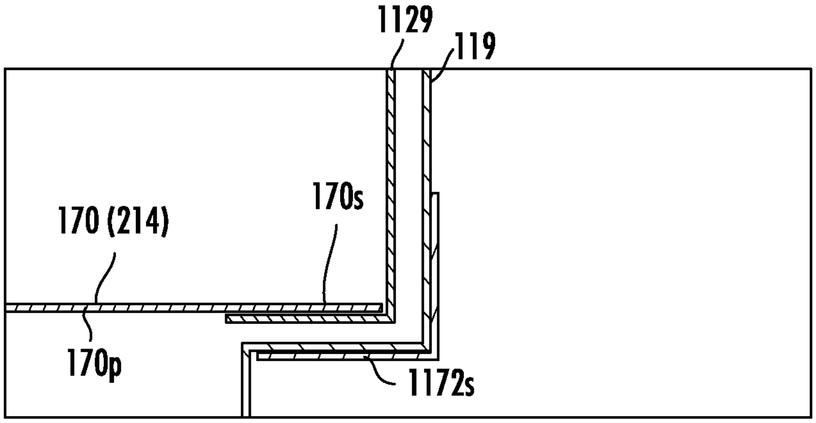
FIGS. 19A-19H are greatly enlarged views of the interface of the passive antenna reflector and example conductive member(s) of the active antenna module illustrating example (capacitive) coupling interfaces according to embodiments of the present invention.
Figure 19B:
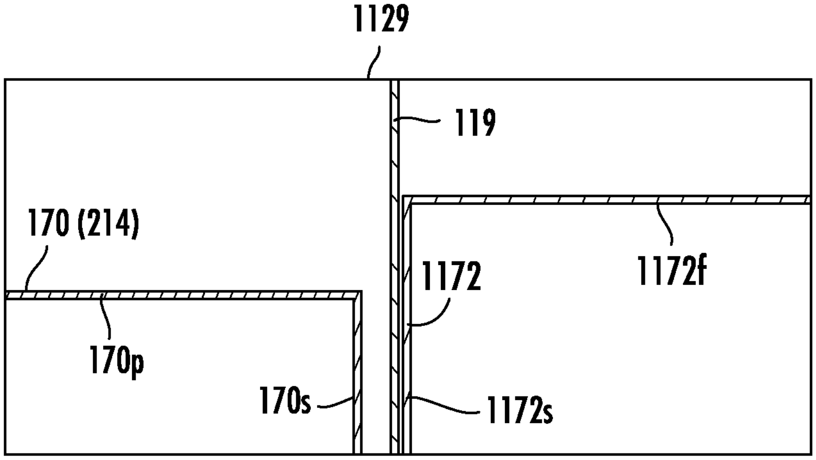

FIGS. 19A and 19B are greatly enlarged section views of example coupling surfaces of reflector 170 to conductive member 1172 interfaces. FIG. 19A illustrates a horizontal coupling configuration (in the orientation shown) between the horizontal surface of the reflector 170 and the conductive member 1172 of the active antenna module 110. FIG. 10E illustrates a vertical coupling configuration (in the orientation shown) between the reflector 170 and conductive member 1172. Stated differently, the coupling configurations can be provided by one or both of surface area segments 1172*s*, 170*s* that are parallel to each other and may include one or more segments that are parallel to and/or perpendicular to a primary surface thereof, respectively.

Figure 19C:
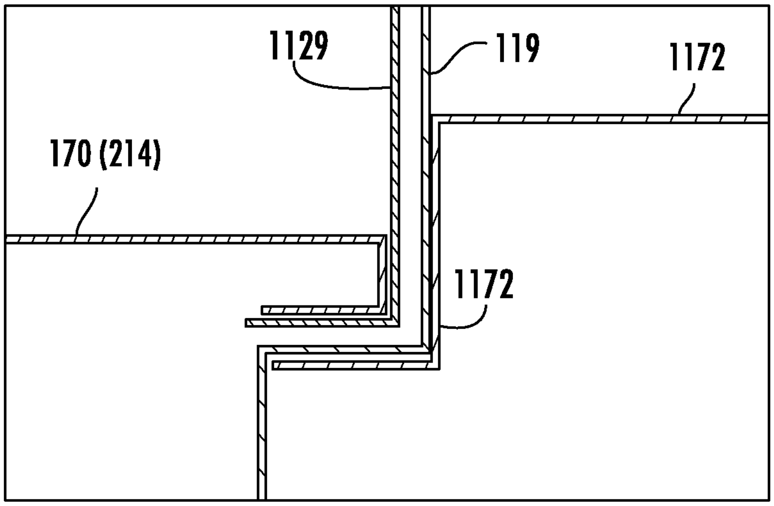
Figure 19D:
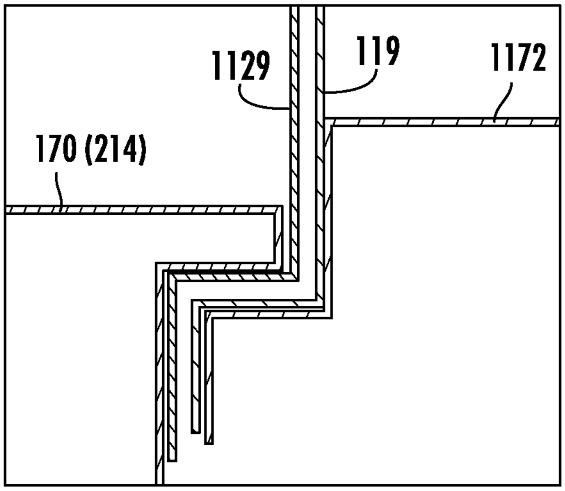
Figure 19E:
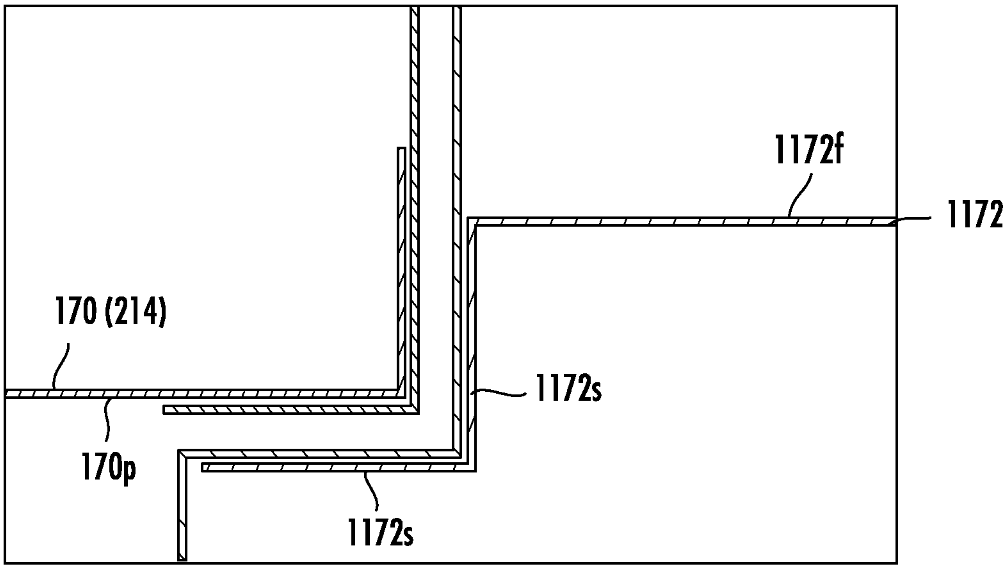
Figure 19F:
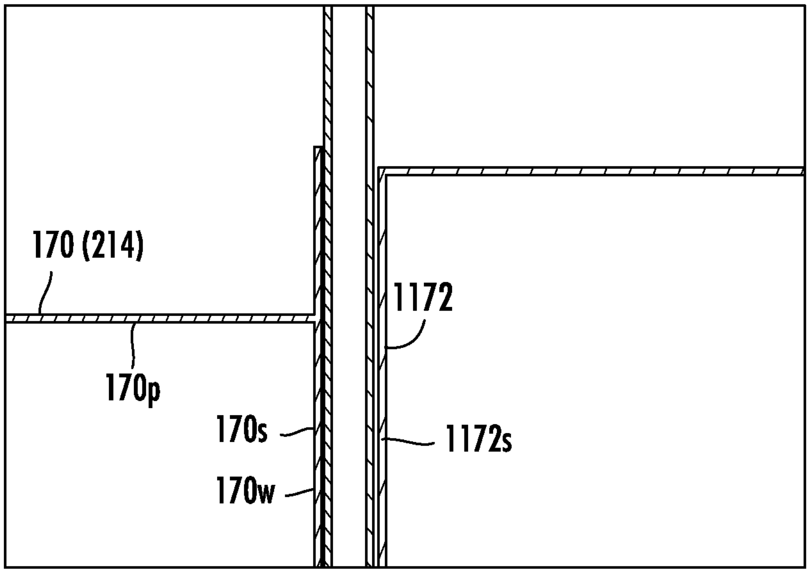
Figure 19G:
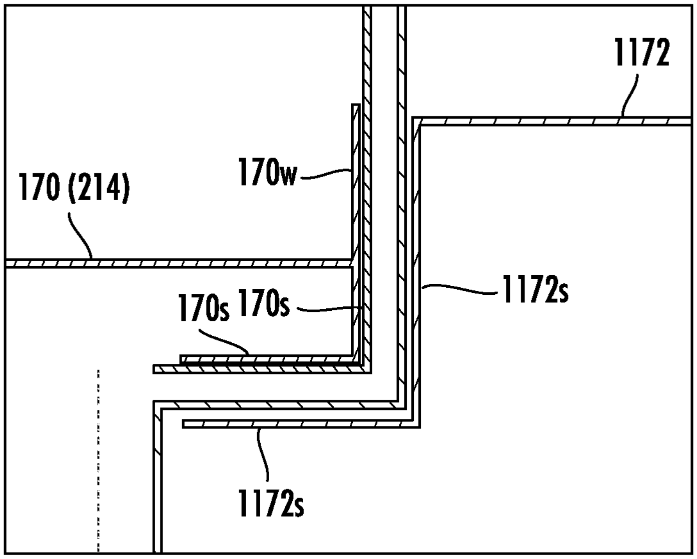
Figure 19H:
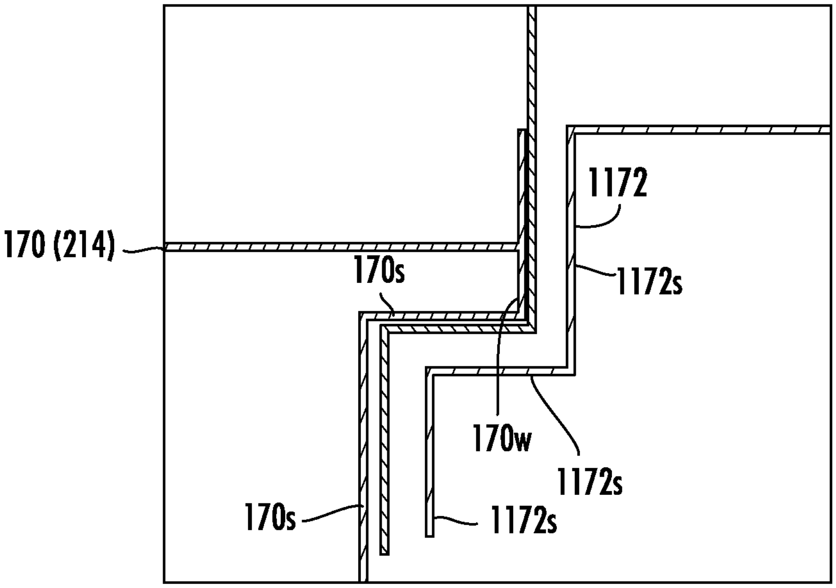

FIGS. 19C-19D illustrate modifications to the coupling configurations that increase the surface area of the coupling segments 170*s*, 1172*s* of the conductive member 1172 of the (removable) active antenna module 110 and the (fixed) reflector 170(214) of the base station antenna housing 100*h*.

FIGS. 19E-19H illustrate that an inner side wall 170*w* can be provided by the passive reflector 170. The side wall 170*w* can be perpendicular to the primary surface 170*p* of the reflector 170.

The coupling of the conductive member and reflector 1172, 170, respectively, can allow the separate installation of the active antenna module 110 and can be configured to use any capacitive coupling and may include a plate capacitor type configuration.

Referring to FIG. 8B, the active antenna module 110 can be coupled to the housing 100*h* and, when installed, can form part of the rear 100*r* of the antenna 100. The active antenna module 110 can have an inner facing surface that can optionally have a seal interface 112 that can be sealably and releasably coupled to the rear 100*r* of the housing 100*h* to provide a water-resistant or water-tight coupling therebetween. The active antenna module 110 can be mounted to the recessed segment/receiving chamber 155 of the antenna housing 100*h* so that a rear face 110*r* is externally accessible and exposed to environmental conditions. The active antenna module 110 can have an inner facing surface with an outer perimeter portion 110*p*. As shown, the base station antenna 100 includes a housing 100*h* with the front and rear 100*f*, 100*r* and a top end 120 and a bottom end 130. The bottom end 130 includes a plurality of connectors 140 mounted thereto. In some embodiments, the rear 100*r* can include a longitudinally and laterally extending recessed segment 108. The recessed segment 108 can longitudinally extend a sub-length "D" of the rear 100*r* of the housing 100*h*. The distance D (the overall length of the active module 110) can be in a range of about 25%-95% of an overall length L of the (passive) antenna housing 100*h*, typically in a range of about 25%-60%, more typically in a range of about 25-40%, such as, for example, a range of about 18-48 inches, in some embodiments. For additional discussions of example base station antennas 100 and active antenna modules 110, see U.S. patent application Ser. No. 17/209,562, the contents of which are hereby incorporated by reference as if recited in full herein.

Figure 9B:
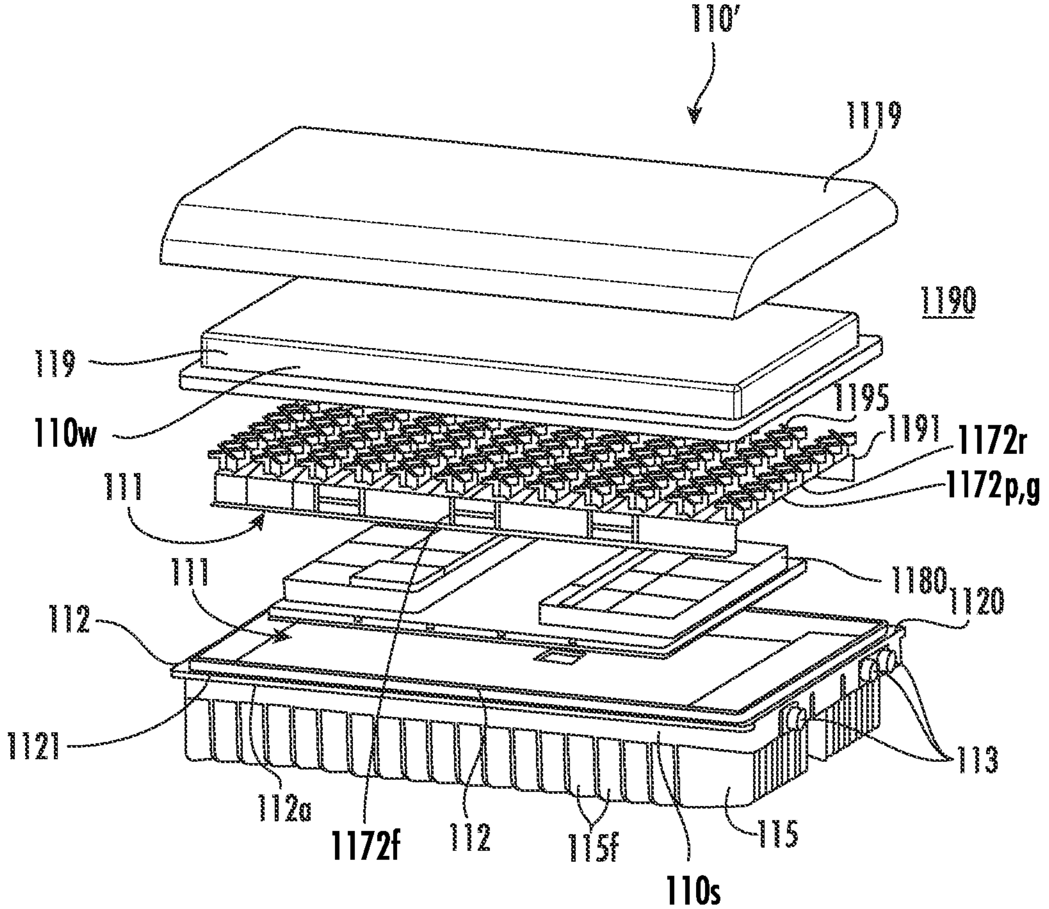
FIG. 9B is a partially exploded side perspective view of another example of an active antenna module according to embodiments of the present invention.

FIG. 9B illustrates an example active antenna module 110 in greater detail. The active antenna module 110 includes radio circuitry and can be partially inserted through the rear of the housing 100*r*. The active antenna module 110 can comprise a radio unit 1120. The active antenna module 110 can also include a heat sink 115 and fins 115*f*. The active antenna module 110 can also include a filter and calibration printed circuit board assembly 1180, and an antenna assembly 1190 comprising radiating elements 1195. The antenna assembly 1180 may also include phase shifters 1191, which may alternatively be part of the filter and calibration assembly 1180. The radiating elements 1195 can be provided as a massive MIMO array. The radiating elements 1195 can project forward of a multi-layer printed circuit board 1172*p* with a ground plane 1172*g* or a reflector 1172*r*. A conductive support frame 1172*f* provided as a grid structure may be provided across and along the active antenna module 110. The conductive support frame 1172*f* can have sides that bend to be orthogonal to the circuit board 1172*p* and that can capacitively or galvanically couple to the reflector 170.

The radio unit 1120 typically includes radio circuitry that converts base station digital transmission to analog RF signals and vice versa. One or more of the radio unit 1120, the antenna assembly 1190 or the filter and calibration assembly 1180 can be provided as separate sub-units that are attachable (stackable). The radio unit 1120 and the antenna assembly 1190 can be provided as an integrated unit, optionally also including the calibration assembly 1180. Where configured as sub-units, different sub-units can be provided by OEMs or cellular service providers while still using a common base station antenna housing 100*h* and passive antenna assembly 190 thereof. The antenna assembly 1190 can couple to the filter and calibration board assembly 1180 via, for example, pogo connectors 111. Other connector configurations may be used for each of the connections, such as, for example 3-piece SMP connectors. The radio unit 1120 can also couple to the filter and calibration board assembly 1180 via pogo connectors 111 thereby providing an all blind-mate connection assembly without requiring cable connections. Alignment of the cooperating components within a tight tolerance may be needed to provide suitable performance.

The antenna module 110 can include a second radome 1119 that can cover the first radome 119 for aesthetic purposes. The second radome 1119 can be used as an aesthetic cover when the active antenna module 110 is provided for shipment as a standalone product. The radio unit 1120 can be wider than the antenna element array 1195 so the radome 119 is shaped to allow the radiating elements 1195 but not the radio 1120, or at least not the entire radio/radio unit 1120, to fit inside the housing 100*h*.

The active antenna module 110 can also include externally accessible connectors 113 on a bottom end thereof. The externally accessible connectors 113 are externally accessible in-use and when the active antenna module 110 is coupled to the base station antenna housing 100*h*. The externally accessible connectors 113 are typically for connecting power and fiber optic cables to the active antenna module 110. In some embodiments, one or more connectors 113 can be configured to couple to an AISG cable to control (passive) RET. Connectors can be provided at other locations such as sides or both ends and sides.

FIG. 20 is a front view of the passive antenna assembly 190 of base station antenna 100 (with the active antenna module 110 mounted thereon). As shown, the antenna assembly 190 includes a main backplane 210 that has side walls 212 and a main reflector 214. The backplane 210 may serve as both a structural component for the antenna assembly 190 and as a ground plane and reflector for the radiating elements mounted thereon. The backplane 210 may also include brackets or other support structures (not shown) that extend between the side walls 212 along the rear of the backplane 210. Various mechanical and electronic components of the antenna 100 are mounted between the side walls 212 and the back side of the main reflector 214, such as phase shifters, remote electronic tilt units, mechanical linkages, controllers, diplexers, and the like as is well known in the art.

The main backplane 210 defines a main module of the passive antenna assembly 190. The main reflector 214 may comprise a generally flat metallic surface that extends in the longitudinal direction L of the antenna 100. The main reflector 214 can be the reflector 170 discussed above or can be an extension of, coupled to or different from the reflector 170 discussed above. If the main reflector 214 is a separate reflector it is coupled to the reflector 170 to provide a common electrical ground.

Some of the radiating elements (discussed below) of the antenna 100 may be mounted to extend forwardly from the main reflector 214, and, if dipole-based radiating elements are used, the dipole radiators of these radiating elements may be mounted, for example, approximately ¼ of a wavelength of the operating frequency for each radiating element forwardly of the main reflector 214. The main reflector 214 may serve as a reflector and as a ground plane for the radiating elements of the antenna 100 that are mounted thereon.

Still referring to FIG. 20, the base station antenna 100 can include one or more arrays 220 of low-band radiating elements 222, one or more arrays 230 of first mid-band radiating elements 232, one or more arrays 240 of second mid-band radiating elements 242 and one or more arrays 250 of high-band radiating elements 1195. The radiating elements 222, 232, 242, 1195 may each be dual-polarized radiating elements. Further details of radiating elements can be found in co-pending WO2019/236203 and WO2020/072880, the contents of which are hereby incorporated by reference as if recited in full herein.

The low-band radiating elements 222 are mounted to extend forwardly from the main or primary reflector 214 (and/or the reflector 170) and can be mounted in two columns to form two linear arrays 220 of low-band radiating elements 222. Each low-band linear array 220 may extend along substantially the full length of the antenna 100 in some embodiments.

The low-band radiating elements 222 may be configured to transmit and receive signals in a first frequency band. In some embodiments, the first frequency band may comprise the 617-960 MHz frequency range or a portion thereof (e.g., the 617-896 MHz frequency band, the 696-960 MHz frequency band, etc.). The low-band linear arrays 220 may or may not be used to transmit and receive signals in the same portion of the first frequency band. For example, in one embodiment, the low-band radiating elements 222 in a first linear array 220 may be used to transmit and receive signals in the 700 MHz frequency band and the low-band radiating elements 222 in a second linear array 220 may be used to transmit and receive signals in the 800 MHz frequency band. In other embodiments, the low-band radiating elements 222 in both the first and second linear arrays 220-1, 220-2 may be used to transmit and receive signals in the 700 MHz (or 800 MHz) frequency band.

The first mid-band radiating elements 232 may likewise be mounted to extend forwardly from the main reflector 214 and may be mounted in columns to form linear arrays 230 of first mid-band radiating elements 232. The linear arrays 230 of mid-band radiating elements 232 may extend along the respective side edges of the main reflector 214. The first mid-band radiating elements 232 may be configured to transmit and receive signals in a second frequency band. In some embodiments, the second frequency band may comprise the 1427-2690 MHz frequency range or a portion thereof (e.g., the 1710-2200 MHz frequency band, the 2300-2690 MHz frequency band, etc.). In the depicted embodiment, the first mid-band radiating elements 232 are configured to transmit and receive signals in the lower portion of the second frequency band (e.g., some or all of the 1427-2200 MHz frequency band). The linear arrays 230 of first mid-band radiating elements 232 may be configured to transmit and receive signals in the same portion of the second frequency band or in different portions of the second frequency band and may extend substantially the full length of the antenna 100 in some embodiments.

The second mid-band radiating elements 242 can be mounted in columns in the lower medial portion of antenna 100 to form linear arrays 240 of second mid-band radiating elements 242. The second mid-band radiating elements 242 may be configured to transmit and receive signals in the second frequency band. In the depicted embodiment, the second mid-band radiating elements 242 are configured to transmit and receive signals in an upper portion of the second frequency band (e.g., some, or all, of the 2300-2700 MHz frequency band). In the depicted embodiment, the second mid-band radiating elements 242 may have a different design than the first mid-band radiating elements 232.

The high-band radiating elements 1195 can be mounted in columns in the upper medial or center portion of antenna 100 to form (e.g., four) linear arrays 250 of high-band radiating elements. The high-band radiating elements 1195 may be configured to transmit and receive signals in a third frequency band. In some embodiments, the third frequency band may comprise the 3300-4200 MHz frequency range or a portion thereof.

In the depicted embodiment, the arrays 220 of low-band radiating elements 222, the arrays 230 of first mid-band radiating elements 232, and the arrays 240 of second mid-band radiating elements 242 are all part of the passive antenna assembly 190, while the arrays 250 of high-band radiating elements 1195 are part of the active antenna module 110. It will be appreciated that the types of arrays included in the passive antenna assembly 190, and/or the active antenna module 110 may be varied in other embodiments.

It will also be appreciated that the number of linear arrays of low-band, mid-band and high-band radiating elements may be varied from what is shown in the figures. For example, the number of linear arrays of each type of radiating elements may be varied from what is shown, some types of linear arrays may be omitted and/or other types of arrays may be added, the number of radiating elements per array may be varied from what is shown, and/or the arrays may be arranged differently. As one specific example, the two linear arrays 240 of second mid-band radiating elements 242 may be replaced with four linear arrays of ultra-high-band radiating elements that transmit and receive signals in a 5 GHz frequency band.

The low-band and mid-band radiating elements 222, 232, 242 may each be mounted to extend forwardly of and/or from the main reflector 214.

Each array 220 of low-band radiating elements 222 may be used to form a pair of antenna beams, namely an antenna beam for each of the two polarizations at which the dual-polarized radiating elements are designed to transmit and receive RF signals. Likewise, each array 232 of first mid-band radiating elements 232, and each array 242 of second mid-band radiating elements 242 may be configured to form a pair of antenna beams, namely an antenna beam for each of the two polarizations at which the dual-polarized radiating elements are designed to transmit and receive RF signals. Each linear array 220, 230, 240 may be configured to provide service to a sector of a base station. For example, each linear array 220, 230, 240 may be configured to provide coverage to approximately 120° in the azimuth plane so that the base station antenna 100 may act as a sector antenna for a three-sector base station. Of course, it will be appreciated that the linear arrays may be configured to provide coverage over different azimuth beamwidths. While all of the radiating elements 222, 232, 242, 1195 are dual-polarized radiating elements in the depicted embodiments, it will be appreciated that in other embodiments some or all of the dual-polarized radiating elements may be replaced with single-polarized radiating elements. It will also be appreciated that while the radiating elements are illustrated as dipole radiating elements in the depicted embodiment, other types of radiating elements such as, for example, patch radiating elements may be used in other embodiments.

Some or all of the radiating elements 222, 232, 242, 1195 may be mounted on feed boards that couple RF signals to and from the individual radiating elements 222, 232, 242, 1195, with one or more radiating elements 222, 232, 242, 1195 mounted on each feed board. Cables (not shown) and/or connectors may be used to connect each feed board to other components of the antenna 100 such as diplexers, phase shifters, calibration boards or the like.

In some embodiments, the base station antennas 100 may be designed so that a variety of different active antenna modules 110 can be used in a given antenna 100. The active antenna module 110 can be manufactured by any original equipment manufacturer and/or cellular service provider and mounted on the back of the antenna. This allows cellular operators to purchase the base station antennas and the radios mounted thereon separately, providing greater flexibility to the cellular operators to select antennas and radios that meet operating needs, price constraints and other considerations.

The antennas 100 may have a number of advantages over conventional antennas. As cellular operators upgrade their networks to support fifth generation ("5G") service, the base station antennas that are being deployed are becoming increasingly complex. It is desirable to minimize antenna size and/or integrate increased number of antenna or antenna elements inside a single bases station antenna/external radome. For example, due to space constraints and/or allowable antenna counts on antenna towers of existing base stations, it may not be possible to simply add new antennas to support 5G service. Accordingly, cellular operators are opting to deploy antennas that support multiple generations of cellular service by including linear arrays of radiating elements that operate in a variety of different frequency bands in a single antenna. Thus, for example, it is common now for cellular operators to request a single base station antenna that supports service in three, four or even five or more different frequency bands. Moreover, in order to support 5G service, these antennas may include multi-column arrays of radiating elements that support active beamforming. Cellular operators are seeking to support all of these services in base station antennas that are comparable in size to conventional base station antennas that supported far fewer frequency bands.

The active antenna modules 110 may also be readily replaced in the field. As is well known, base station antennas are typically mounted on towers, often hundreds of feet above the ground. Base station antennas may also be large, heavy and mounted on antenna mounts that extend outwardly from the tower. As such, replacing base station antennas may be difficult and expensive. The active antenna modules 110 with beamforming radios may be field installable and/or replaceable without the need to detach the base station antenna 100 from an antenna mount.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.)

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The term "about" used with respect to a number refers to a variation of +/−10%.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

That which is claimed is:

1. A base station antenna, comprising:

a passive antenna assembly comprising a housing and a reflector in the housing, wherein the reflector comprises a longitudinally extending right side segment and a laterally spaced apart and longitudinally extending left side segment;

an active antenna module coupleable to or coupled to the housing of the passive antenna assembly; and first and second spaced apart and longitudinally extending coupling brackets, the first coupling bracket extending along a left side of the active antenna module, the second coupling bracket extending along a right side of the active antenna module.

2. The base station antenna of claim 1, wherein the first and second coupling brackets electrically couple an outer wall of the active antenna module to the reflector.

3. The base station antenna of claim 1, wherein the first and second coupling brackets comprise RF chokes.

4. The base station antenna of claim 3, wherein the first segment of the L-shaped body is parallel to and adjacent the outer wall of the active antenna module is a long side segment.

5. The base station antenna of claim 1, wherein the first and second coupling brackets each comprise an L-shaped body, and wherein a first segment of the L-shaped body is parallel to and adjacent the outer wall of the active antenna module.

6. The base station antenna of claim 5, wherein the first segment of the L-shaped body merges into a second segment that is orthogonal to the first segment and that is parallel to a rail coupling surface of a rail provided by the housing.

7. The base station antenna of claim 6, wherein the second segment that is parallel to the rail coupling surface is a short side of the L-shaped body.

8. The base station antenna of claim 7, wherein the second segment of the coupling bracket is internal to the housing and the first segment projects rearward and outwardly from the housing.

9. The base station antenna of claim 1, wherein the first and second coupling brackets are provided as a unitary body connected by a laterally extending bracket segment.

10. The base station antenna of claim 1, wherein the active antenna module comprises a radio unit, a massive MIMO antenna array and a radome, and wherein the radome of the active antenna module faces an external front radome provided by the passive antenna assembly.

11. The base station antenna of claim 10, wherein the passive antenna assembly comprises an internal radome that extends in front of the radome of the active antenna module and across a rear of the housing.

12. The base station antenna of claim 1, wherein the first and second coupling brackets are capacitively coupled to the reflector and the active antenna module.

13. The base station antenna of claim 3, wherein the RF chokes comprise a first RF choke and a second RF choke, wherein, when viewed from a front of the base station antenna, a right side of the first RF choke is capacitively coupled to the active antenna module, wherein a left side of the first RF choke is capacitively coupled to the left side segment of the reflector, wherein a left side of the second RF choke is capacitively coupled to the active antenna module, and wherein a right side of the second RF choke is capacitively coupled to the left side segment of the reflector.

14. The base station antenna of claim 1, wherein the first and second coupling brackets are capacitively coupled to one or both of the active antenna module or the reflector through at least one radome.

15. The base station antenna of claim 1, wherein the first and second coupling brackets are capacitively coupled to the active antenna module and the reflector through a first radome of the active antenna module and a second radome of the passive antenna assembly, the first radome coupled to the active antenna module and the second radome residing between the first radome and an external front radome of the passive antenna assembly.

16. The base station antenna of claim 1, wherein the reflector is galvanically coupled to the active antenna module.

17. The base station antenna of claim 1, wherein the reflector is capacitively coupled to the active antenna module.

18. The base station antenna of claim 1, wherein the reflector is capacitively coupled to at least one conductive member of the active antenna module through at least one radome.

19. The base station antenna of claim 18, wherein the at least one conductive member comprises a side wall and a support frame that is coupled to the side wall, and wherein the support frame is electrically coupled to a ground plane behind a massive MIMO antenna array inside the active antenna module.

20. The base station antenna of claim 1, wherein the active antenna module and/or the housing comprises a mounting interface configured to have a lock member that has a first recessed position and a second extended position, wherein, in the second extended position, the lock member locks the housing and the active antenna module together.

21. The base station antenna of claim 1, wherein the reflector comprises a laterally and longitudinally extending open space between the right and left side segments aligned with the active antenna module.

22. The base station antenna of claim 1, wherein the reflector comprises an aperture extending laterally between the right and left side segments, and wherein the active antenna module comprises a radome that extends through and resides in front of the aperture.

23. The base station antenna of claim 1, further comprising at least one array of low band radiating elements, wherein the at least one array of low band radiating elements extend forward in the housing in front of the reflector.

24. The base station antenna of claim 1, wherein the first and second coupling brackets are configured as dual band RF chokes.

* * * * *